United States Patent [19]

Weinberger et al.

[11] 4,122,308
[45] Oct. 24, 1978

[54] TELEPHONE CALL METERING DEVICE

[75] Inventors: Gerald J. Weinberger, Commack; Stanley F. Miller, Rocky Point, both of N.Y.

[73] Assignee: Utility Verification Corp., Commack, N.Y.

[21] Appl. No.: 803,203

[22] Filed: Jun. 3, 1977

[51] Int. Cl.$^2$ .................... H04M 15/18; H04M 17/00
[52] U.S. Cl. ............................ 179/7.1 R; 179/6.3 R; 179/18 B
[58] Field of Search .............. 179/7.1 R, 7.1 TP, 7 R, 179/7 MB, 18 AD, 18 B, 18 D, 18 DA, 18 ES, 27 FF, 6.3 R, 6.31, 6.4, 6.5

[56] References Cited

U.S. PATENT DOCUMENTS

| | | | |
|---|---|---|---|
| 3,702,381 | 11/1972 | Halbedel et al. | 179/27 FF |
| 3,769,463 | 10/1973 | Graham et al. | 179/7.1 TP |
| 3,806,652 | 4/1974 | Woolf et al. | 179/7.1 R |
| 3,931,476 | 1/1976 | Matthews | 179/18 DA |
| 4,041,291 | 8/1977 | Pavda | 179/7.1 R |
| 4,045,619 | 8/1977 | Harrington | 179/7.1 R |

OTHER PUBLICATIONS

"The New Coin Box Set AZ 44," *Hasler Review*, vol. 9, No. 2, pp. 51–56, Summer 1976, A. Nyffenegger.

*Primary Examiner*—William C. Cooper
*Assistant Examiner*—Gerald L. Brigance
*Attorney, Agent, or Firm*—Arthur L. Lessler

[57] ABSTRACT

A telephone accessory device for monitoring the cost of a telephone call at the location of the calling telephone. A keyboard is provided through which the number to be called is entered; this number appears on a display and can be checked for accuracy before the number is actually "dialed" by depressing another key on the keyboard. At this time the initial billing rate and initial billing time period appear on digital displays, as well as the billing rate for the next billing time period and the corresponding period duration. Circuitry is provided to continually maintain the billing displays on a current basis, to provide an accurate indication of the cost of the call. At the conclusion of the call the total cost thereof is automatically entered into an accumulator which provides information as to the total month-to-date costs of calls placed from the telephone.

Determination of the cost of each call is made by addressing a memory which contains billing rate information, the memory being addressed in accordance with the number of the telephone called.

Provision is made to provide warning signals indicating when (i) the cost of a particular call exceeds a preset dollar limit or (ii) the end of a billing rate period is being approached. Information respecting the cost of each call and, if desired, an identification file or account number, may be coupled to an incremental tape recorder to provide a complete permanent record of telephone calls made during a particular time period.

Also described is a telephone call routing device for selecting that one of a number of the line circuits which minimizes the cost of a call to a specified telephone number. According to another disclosed feature, the cost metering device of the invention is incorporated in a coin operated telephone to meter payment for long distance calls without operator intervention.

45 Claims, 14 Drawing Figures

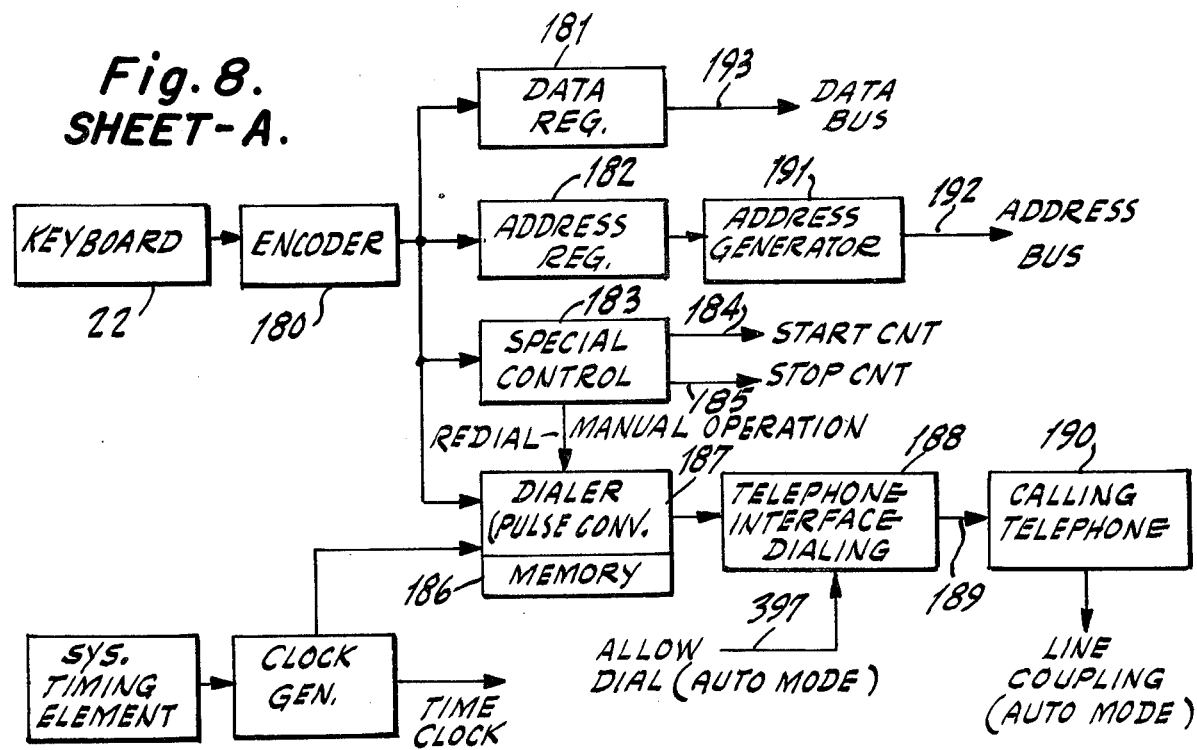
Fig. 8.
SHEET-A.
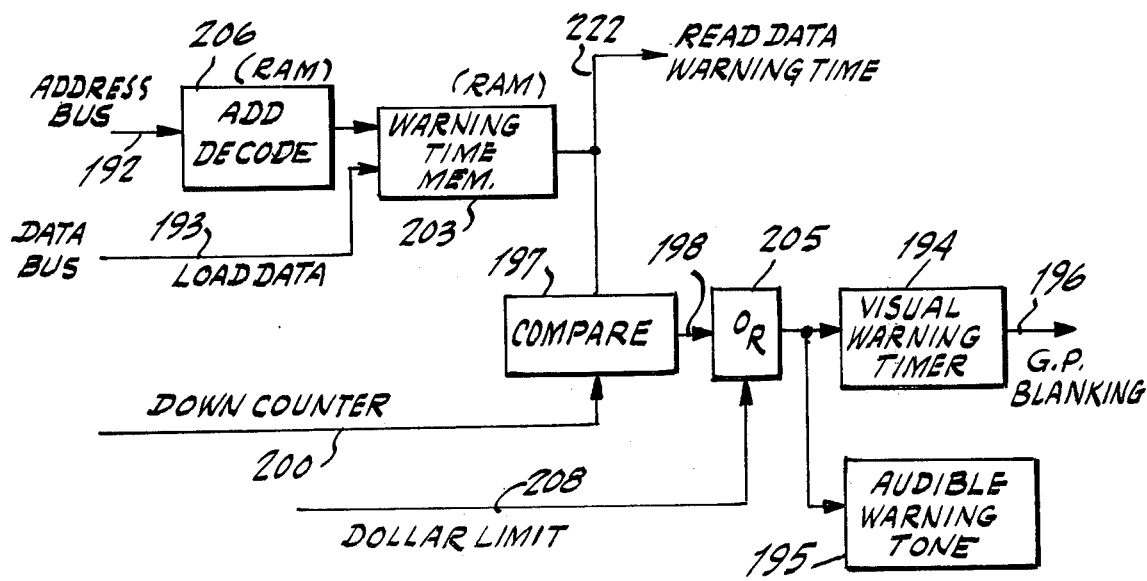

SHEET-B.

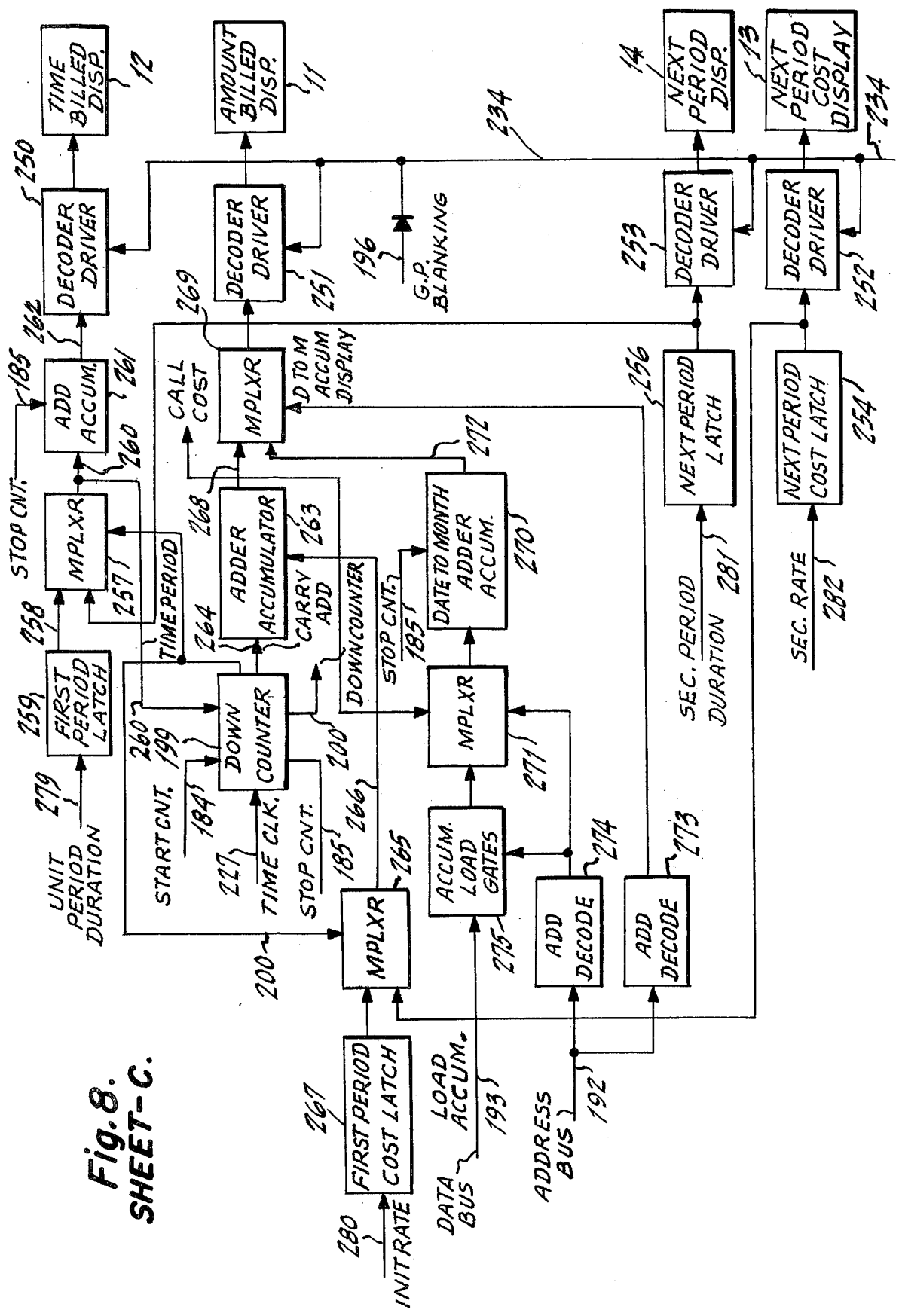

SHEET-D.

SHEET-E

SHEET-F.

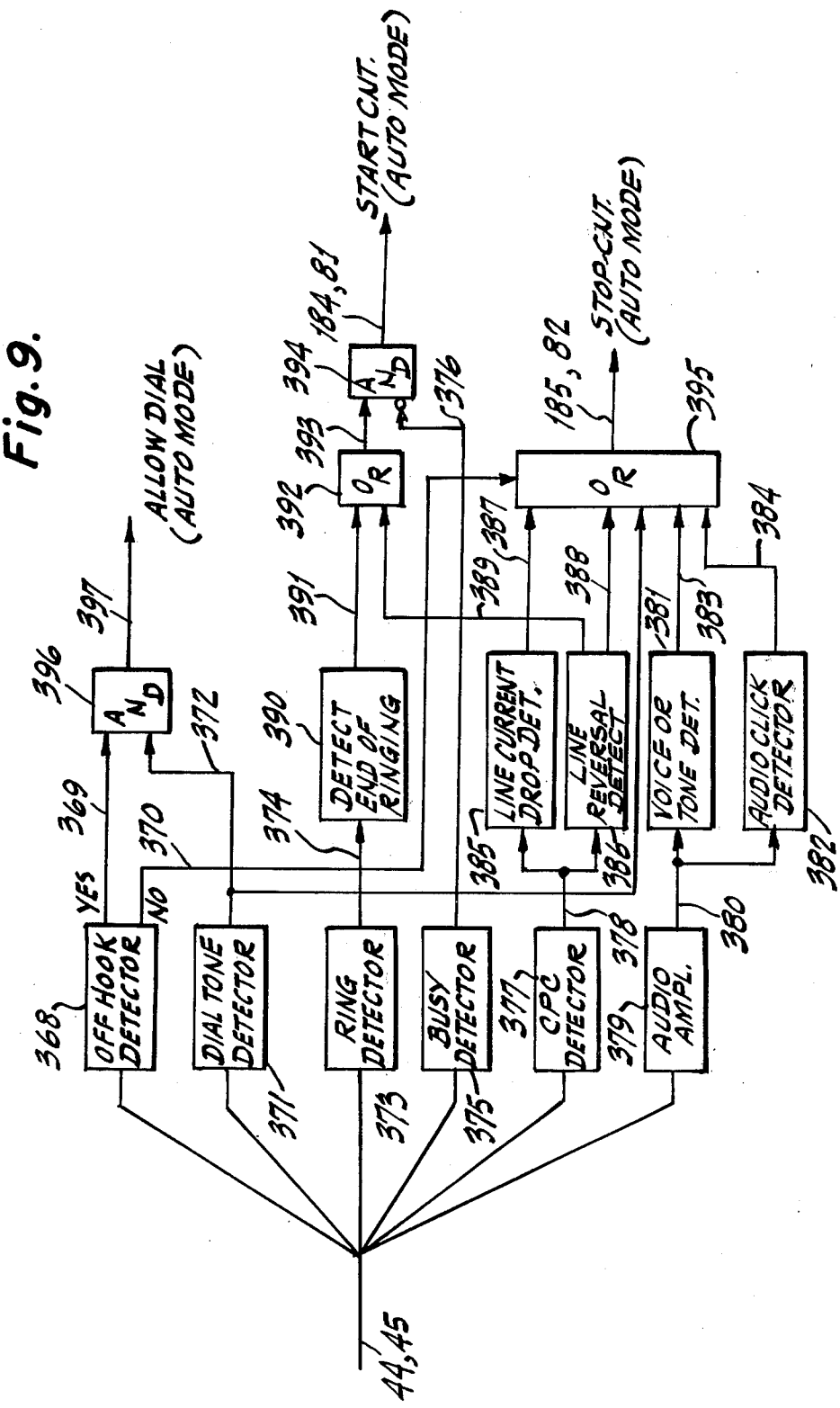

TELEPHONE CALL METERING DEVICE

This invention relates to a telephone call metering device, and more particularly to apparatus associated with a telephone for providing information, on a real time basis, as to the cost of telephone calls made from said telephone to another telephone.

In order to assist in controlling the rapidly rising costs of telephone service, and to facilitate allocation of telephone costs to applicable accounts or work orders, within a company, it is highly desirable to provide each telephone with a metering device which is capable of indicating, on a real time basis, the costs of telephone calls made from the associated telephone. The billing techniques employed within the telephone system itself employ metering pulses and/or other techniques which are either not available or not suitable for incorporation in decentralized telephone cost metering devices of the type herein described.

Accordingly, an object of the present invention is to provide telephone call cost determining apparatus associated with a telephone used by a calling party for providing information, on a real time basis, as to the cost of telephone calls placed therefrom.

Another object of the invention is to provide a telephone call routing device for minimizing the cost of a telephone call from a first telephone having a corresponding first telephone number to a second telephone having a corresponding second telephone number via one of a number of available telephone transmission circuits therebetween.

A further object of the invention is to provide a coin operated telephone including means for determining the cost of telephone calls made therefrom, and for regulating the operation thereof in accordance with the determined cost and the amount of payment made to said telephone with respect to the corresponding call.

As herein described, there is provided a telephone call timing device for determining the cost of a telephone call from a first telephone to a selected one of a multiplicity of second telephones each having a corresponding second telephone number, said cost being dependent upon a predetermined billing rate schedule and the duration of the call, said device comprising a first memory for storing a first coded signal corresponding to said first telephone number; telephone rate memory means for storing coded rate signals corresponding to said billing rate schedule, said stored rate signals comprising rate information for telephone calls to various telephone numbers from said first telephone; a keyboard for generating a second coded signal corresponding to said second telephone number; addressing means responsive to said first and second coded signals for addressing said telephone rate memory to select a third coded signal corresponding to rate information stored therein respecting the cost of said call; telephone call timing means responsive to a call connection signal and a call termination signal for providing a coded call duration signal corresponding to the time interval between said connection and termination signals; and cost determination means responsive to said third coded signal and said coded call duration signal for generating a fourth coded signal corresponding to the cost of said call between said first and second telephones.

According to another feature of the invention there is provided a telephone call timing device for determining the cost of a telephone call from a first telephone having a corresponding first telephone number to a selected one of a multiplicity of second telephones each having a corresponding second telephone number, said cost being dependent upon a predetermined billing rate schedule comprising an initial billing rate for a specified initial billing time period and another billing rate for each predetermined additional billing time period, said device comprising: a first memory for storing a first coded signal corresponding to said first telephone number; telephone rate memory means for storing coded rate signals corresponding to said billing rate schedule, said stored rate signals comprising rate information for telephone calls to various telephone numbers from said first telephone; a keyboard for generating second coded signals corresponding to each of said selected second telephone numbers; addressing means responsive to said first and second coded signals for addressing said telephone rate memory to select third coded signals corresponding to rate information stored therein respecting the cost of said call; telephone call timing means responsive to a call connection signal and a call termination signal for providing coded call duration signals corresponding to the time interval between said connection and termination signals; cost determination means responsive to said third coded signals and to said call duration signals for generating fourth coded signals corresponding to the costs of said calls between said first telephone and said selected second telephone numbers; accumulating means coupled to said cost determination means for storing fifth coded signals corresponding to the total cost of all calls made from said first telephone to said selected second telephones during a given time period; and means for displaying cost information corresponding to said fourth and fifth coded signals.

According to still another feature of the invention there is provided a telephone call routing device for minimizing the cost of a telephone call from a first telephone having a corresponding first telephone number to a second telephone having a corresponding second telephone number via one of a number of available telephone transmission circuits therebetween, each circuit having a switching point addressable by a corresponding tie line, each said switching point having a remote telephone number associated therewith, the cost of said call being related to the particular cost of a call from a telephone having said remote number to said second telephone, said device comprising: first memory means for storing first coded signals corresponding to each of said remote telephone numbers; telephone rate memory means for storing therein coded rate signals corresponding to an initial billing rate for calls between each of said switching points having said remote telephone numbers and a multiplicity of other telephones including said second telephones and having corresponding other telephone numbers; addressing means responsive to each of said first coded signals and to second coded signals corresponding to said second telephone number for addressing said telephone rate memory means to generate third coded signals corresponding to each said particular cost of a call from a telephone having one of said remote numbers to said second telephone; and comparison means responsive to said third signals for identifying a selected one of said tie lines corresponding to the lowest value of said particular costs.

According to still a further feature of the invention there is provided in a coin operated telephone having a corresponding first telephone number for placing telephone calls to selected ones of a multiplicity of second telephones each having a corresponding second telephone number, said telephone having dialing means, payment monitoring means and call dialing control means for initiating one of said telephone calls in response to a current cost status signal, telephone rate memory means for storing coded rate signals indicative of the time cost of telephone calls from said first telephone to each of said second telephones; addressing means coupled to said dialing means and responsive to the dialing of a selected one of said second numbers for addressing said memory means to generate selected coded rate signals corresponding to the particular time cost of a call from said first telephone to said second telephone; and metering means responsive to said selected coded rate signals for providing said current cost status signal only when said payment monitoring means indicates receipt of payment in an amount at least equal to said particular time cost.

According to still a further feature of the invention there is provided a telephone call cost determining device for determining and indicating to the calling party the cost of a telephone call from the telephone used by the calling party to any called party having a telephone number different from that of the calling party, said cost being dependent upon a predetermined billing rate schedule and the duration of the call, said device comprising: first memory means for storing a first coded signal corresponding to the telephone number of the calling party; rate memory means for storing coded data corresponding to said billing rate schedule for calls from the telephone of the calling party to the telephone of any called party; means for generating a second coded signal corresponding to the telephone number of a selected called party; control means responsive to said first and second coded signals to address the rate memory means to select the applicable rate and generate output signals which indicate the cost of the call between the calling and called parties for preset time intervals; timing means for measuring the duration of the call between the calling and called parties; cost determining means responsive to the timing means and the rate memory output signals to generate a total cost signal for said call; and indicating means connected to receive said total cost signal and indicate the total cost of said call.

According to still a further feature of the invention there is provided a telephone call cost determining device for determining and indicating to the calling party that cost of a telephone call from a first telephone used by the calling party and having a first telephone number corresponding thereto, to a second telephone of a called party having a corresponding second telephone number, said cost having an initial value for a predetermined incremental time period thereafter, said device comprising: first telephone including dialing means, said device comprising: first memory means for storing a first coded signal corresponding to said first telephone number; rate memory means for storing coded data corresponding to said initial and incremental values, and said initial and incremental time periods, for telephone calls from said first telephone to a multiplicity of other telephones including said second telephone; transducer means responsive to said dialing means for generating a second coded signal corresponding to said second telephone number; control means responsive to said first and second coded signals for generating a rate memory means address signal; memory addressing means responsive to said address signal for addressing said rate memory means to generate coded signals corresponding to said initial and incremental values; timing means for measuring the duration of said telephone call between said first and second telephones, and for providing timing signals at the expiration of said initial period and of each incremental period thereafter; cost determining means responsive to said timing signals and to said coded signals corresponding to said initial and incremental values, for generating a total cost signal corresponding to the total current cost of said telephone call; and means for indicating the value of said total cost signal.

In the drawing:

FIG. 9 is a functional block diagram of a modification of the device of FIG. 8, for automatic call duration timing.

Perhaps the most instructive manner in which to understand the function of applicant's device is to describe the manner in which it is utilized by the calling party or user thereof in its various modes of operation. This explanation will best be understood by reference to FIG. 3 in conjunction therewith.

The metering device hereafter described has three principal modes of operation, viz. (1) manual timing mode, (2) automatic timing mode, and (3) rate determination mode. In the manual timing mode the duration of the telephone call is manually entered into the metering device by the calling party, while in the automatic timing mode the connection and termination of the call are automatically sensed and utilized to control the metering device. Both the manual and automatic timing modes are operable while a telephone call is actually in process. In contradistinction, the rate determination mode is utilized merely to determine the cost basis involved in placing the particular telephone call, without actually placing the call.

Figure 3:
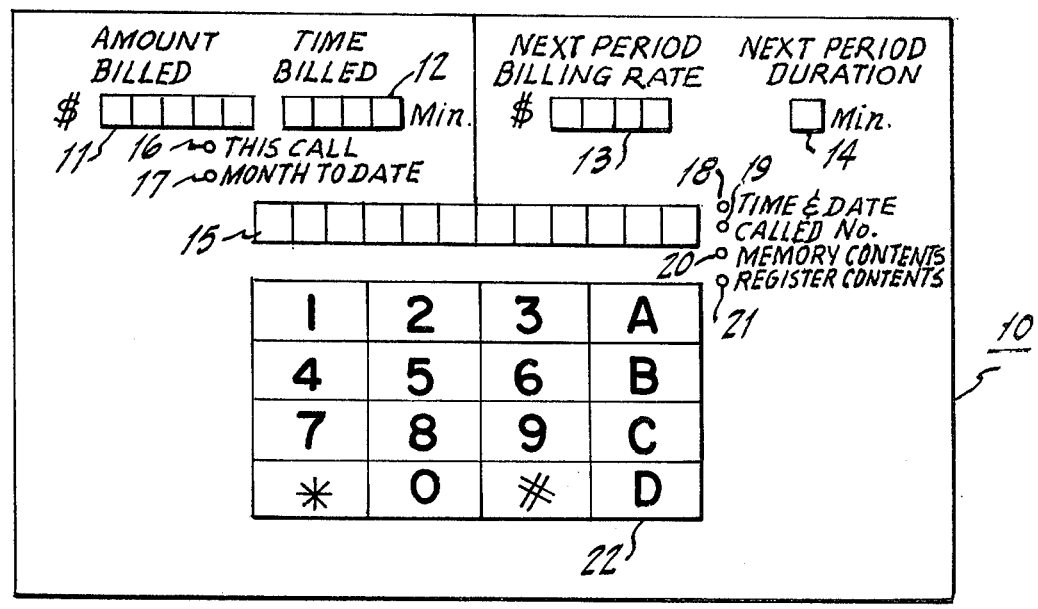
FIG. 3 shows the keyboard and display of the metering device shown in FIG. 2.

The display/control panel of the metering device 10 shown in FIG. 3 has five digital readouts, viz. (i) amount billed readout 11, (ii) time billed readout 12, (iii) next period billing rate readout 13, (iv) next period duration readout 14, (v) general purpose readout 15. These readouts display the corresponding values in decimal digits, with the readouts 11 to 15 having decimal digit capacities of 5, 4, 4, 1, and 12 digits respectively.

The readout 11 displays the current cost of the telephone call made or to be made, in dollars and cents (or other appropriate currency); when the indicator light 16 is illuminated. When the indicator light 17 is illuminated, the readout 11 displays the total accumulated cost of all telephone calls made via the device 10 from the beginning of the corresponding month to date.

Similarly, when the indicator light 16 is illuminated the readout 12 displays the billed time of the particular telephone call placed or to be placed. When the light 17 is illuminated, the readout 12 displays the total telephone time billed from the beginning of the corresponding month to date.

The readouts 11 and 12 are of an incremental nature in accordance with the corresponding billing rates. For example, if the initial billing rate of a particular telephone call is $5.00 for the first three minutes and $1.00 for each additional minute, the readout 11 would initially display a billed amount of $5.00 and the readout 12 would initially display a billed time of three minutes. As soon as the duration of the telephone call exceeds three minutes, the readout 11 would change to indicate a billed amount of $6.00 and the readout 12 would then indicate a billed time of four minutes. That is, as soon as a particular billing time interval is exceeded, the incremental cost associated with the next billing rate period is immediately added. With the foregoing example, a call which lasts three minutes and one second would cost $6.00, as would a call which lasts four minutes.

The readout 13 indicates the cost of the next billing rate period after the initial period. With the foregoing example, the readout 13 would indicate a next period billing rate of $1.00, for the entire duration of the telephone call being made. The readout 14 indicates the incremental period associated with the next period billing rate shown by the readout 13. With the foregoing example, the next period duration readout 14 would indicate a duration of one minute during the entire time of the call being placed.

The general purpose readout 15 indicates the time of day and the day of the month when the device 10 is not being utilized to place a telephone call or determine a telephone calling rate. When the readout 15 is being utilized to perform a telephone metering function (or related operation) of the metering device 10, various items of information can be called up for display therein, with the lights 18 to 21 indicating the type of information being displayed.

Illumination of the light 18 indicates that the metering device 10 is dormant, with the readout 15 simply indicating time of day and date of month. Illumination of the light 19 indicates that the number to be called or the number the rate to which is to be determined is being displayed. Illumination of light 20 indicates that the contents of a particular memory cell are being displayed, while light 21 when illuminated similarly indicates that the contents of a register are being displayed.

The keyboard 22 contains 16 keys, ten of which are associated with numerical values 0 to 9, four of which are identified by the letters A, B, C, and D and associated with data call-up or processing functions as hereafter described. The symbols * and # are associated with control of the metering functions of the device 10, as is also hereafter described.

The function of the key A is to display month to date billing information in the readouts 11 and 12, with the indicator light 17 being simultaneously illuminated. The key B enables a file or account number to be assigned to the particular telephone call billed, for later charging to a particular cost accounting number, client file, work order, etc. When the key B is depressed followed by depression of a sequence of number keys corresponding to the desired file or account number, the number so entered is recorded on a non-volatile storage medium such as magnetic tape, adjacent the record of the corresponding billed amount and billed time.

The key C is utilized to display a desired parameter in the readout 15 and/or to alter said parameter. For example, if the device 10 is moved to a different telephone or the telephone with which it is associated is assigned a different number, by pressing the key C and subsequently entering the number 11, the number of the calling telephone is displayed in the readout 15. This number can thereafter be altered to the new number by entering the new number via the numerical keys and thereafter pressing the # key to clear the display 15 and load the new calling telephone number into the corresponding memory.

The key D is utilized after a telephone number to be "called" is entered into the display 15 by depressing the numerical key corresponding to said number, when it is desired to determine the billing rate for such a telephone call without actually placing the call. In this case, when the key D is displayed the "called" number remains displayed in the readout 15 and the readouts 11 and 12 display the corresponding initial billing amount and time, while the readouts 13 and 14 display the corresponding next period billing information. At this time the light 16 is illuminated.

The # key has a dual function, viz. (i) to clear the display 15 and load the contents thereof into the corresponding memory, and (ii) if the # key is depressed after depressing the * key, a call termination signal is generated which causes the metering device 10 to cease timing the call.

The * key likewise has a dual function, viz. (i) to start timing of the billing of a telephone call, and (ii) to cause the call to be automatically redialed in the event the * key is depressed after depressing the # key. Such a readout function may be useful, e.g., if a busy signal is received during the initial dialing operation.

The functions of the various keys of the keyboard 22 and the sequence in which keys must be depressed to achieve the desired functions, are set forth in Table I below:

TABLE I

| | Control Functions | Key (s) Depressed |
|---|---|---|
| 1. | Set Time of Day | C1 (New Time) |
| 2. | Set Date | C 2 (New Date) |
| 3. | Enter Called Telephone Number | Numbered Keys |
| 4. | Display Federal, State or Local Tax Rate | C3, C4, C5 |
| 5. | Address Memory | C6 (Address) |
| 6. | Modify Data in Memory | C6 (Address) (New Data) |
| 7. | Address Register | C7 (Address) |
| 8. | Modify Data in Register | C7 (Address) (New Data) |
| 9. | Display Month-To-Date Billed Amount and Billed Time | A |
| 10. | Determine Rate for Entered Telephone Number Without Placing Call | D |
| 11. | Display and/or Modify Warning Time To End of Call Rate Period | C8 (New Data) |
| 12. | Billed Amount at Which Warning is to be Generated | C9 (New Data) |
| 13. | Enter File or Account Number | B (File or Accnt. No.) |
| 14. | Display and/or Modify Retention Time for Display of Billed Amount and Billed Time | C10 (New Data) |
| 15. | Clear Display and Load to Memory | # |
| 16. | Stop Timing of Call | # (After |

TABLE I-continued

| Control Functions | Key (s) Depressed |
| --- | --- |
| 17. Start Timing of Call | Depressing *) * |
| 18. Redial | * (After Depressing #) |
| 19. Calling Telephone Number | C11 |

To utilize the metering device 10 in the manual mode, the calling party would first pick up the telephone associated with said device. He would then dial the number to be called by depressing the numerical keys of the keyboard 22 to enter said number into the display 15. At this time the light 19 would illuminate. Alternatively, if desired the calling party would enter the number to be called as above described without picking up the associated telephone, e.g. if operation by means of a separate speaker arrangement were employed.

The calling party would then push the # key to load the called number into the device 10 and thereby initiate the desired telephone call. The called number would then be internally stored within the device 10. The calling party would subsequently hear the telephone being called ringing, and when the telephone connection is established, i.e. when the ringing stops and the telephone being called is picked up, the calling party would depress the * key to cause the metering device 10 to initiate timing of the call. If a busy signal is received, the calling party could wait a desired time interval, and thereafter push the * key to redial the call automatically.

As soon as the call is initiated by depressing the # key, the corresponding billing rates would appear in the displays 11 to 14. As the call progresses, the amount and time billed as displayed by the readouts 11 and 12 would incrementally increase, with the values displayed by the readouts 13 and 14 remaining constant for the duration of the call.

At the conclusion or termination of the call, i.e. when the connection between the calling and called telephones is broken, the calling party would depress the # key to stop the timing of the call and "freeze" the amounts displayed in the readouts 11 and 12. At the same time, depression of the # key would cause the data displayed in the readouts 11 and 12 to be accumulated within the metering device 10, to "update" the accumulated billing information already stored within said device.

Another feature of the metering device 10 is the capability for warning the calling party when (i) the price of a particular telephone call reaches a preset limit and/or (ii) the time remaining until the next billing period is reached becomes less than a predetermined value. As indicated in Table I, a desired price limit may be entered by depressing the key C followed by the address 9 and subsequently entering the desired limiting value utilizing the numerical keys. Similarly, the time remaining to the end of a call rate period at which a warning is desired, e.g. 15 seconds prior to the end of said period, can be displayed and/or modified by depressing the key C followed by the address 8 and thereafter entering the desired modified data utilizing the numerical keys. The warning indicating that the amount billed has reached a preset limit is displayed by causing the readout 11 to flash, while the warning indicating that a limited time remains to the end of the billing period is displayed by flashing of the readout 12. Alternatively, an audible warning or warnings may be provided if desired.

After the # key is depressed, indicating completion of the call, the billing information remains displayed in the readouts 11 and 12 for a desired period, between 5 and 60 seconds. The particular desired value of this period may be set, as indicated in Table I, by depressing the key C followed by the address 10, and thereafter entering a desired new value by depressing the corresponding numerical keys. If a numerical key is depressed while the displays of the readouts 11 and 12 are still active in determination of a call, these readouts are automatically reset by said key depression.

In the automatic timing mode, the operation of the metering device 10 is substantially the same as described above in connection with the manual timing mode, except that the operator does not depress the * key to start timing of the call, nor does he depress the # key to stop timing thereof. Instead, these operations are automatically carried out by sensing parameters associated with the telephone lines involved.

In the operation of the metering device 10, a signal processor within said device is coupled to the telephone lines which connect the calling telephone to the remainder of the telephone system, i.e. normally a central office. The signal processor derives from said telephone lines one or more of the sensed signals listed in Table II below, depending upon the availability of the corresponding signal information in the particular telephone system involved, and the mode of operation of the metering device.

TABLE II

Sensed Telephone Signals Provided By Signal Processor

1. Off-hook condition
2. Busy
3. Ring
4. C.P.C. (calling party control)
5. Disconnect at called end
6. Absence of voice
7. End of ring
8. Dial tone
9. Line reversal In the rate determination mode, the calling party enters the number to be called into the display 15 in the same manner as in the other modes. However, instead of depressing the # key to initiate the call, he depresses the key D to cause the corresponding billing rates to be displayed in the readouts 11 to 14, while retaining display of the called number in the readout 15 without initiating the call. If the calling party, after thus ascertaining the billing rates involved, desires to initiate the call, he simply subsequently depresses the # key.

Figure 1:
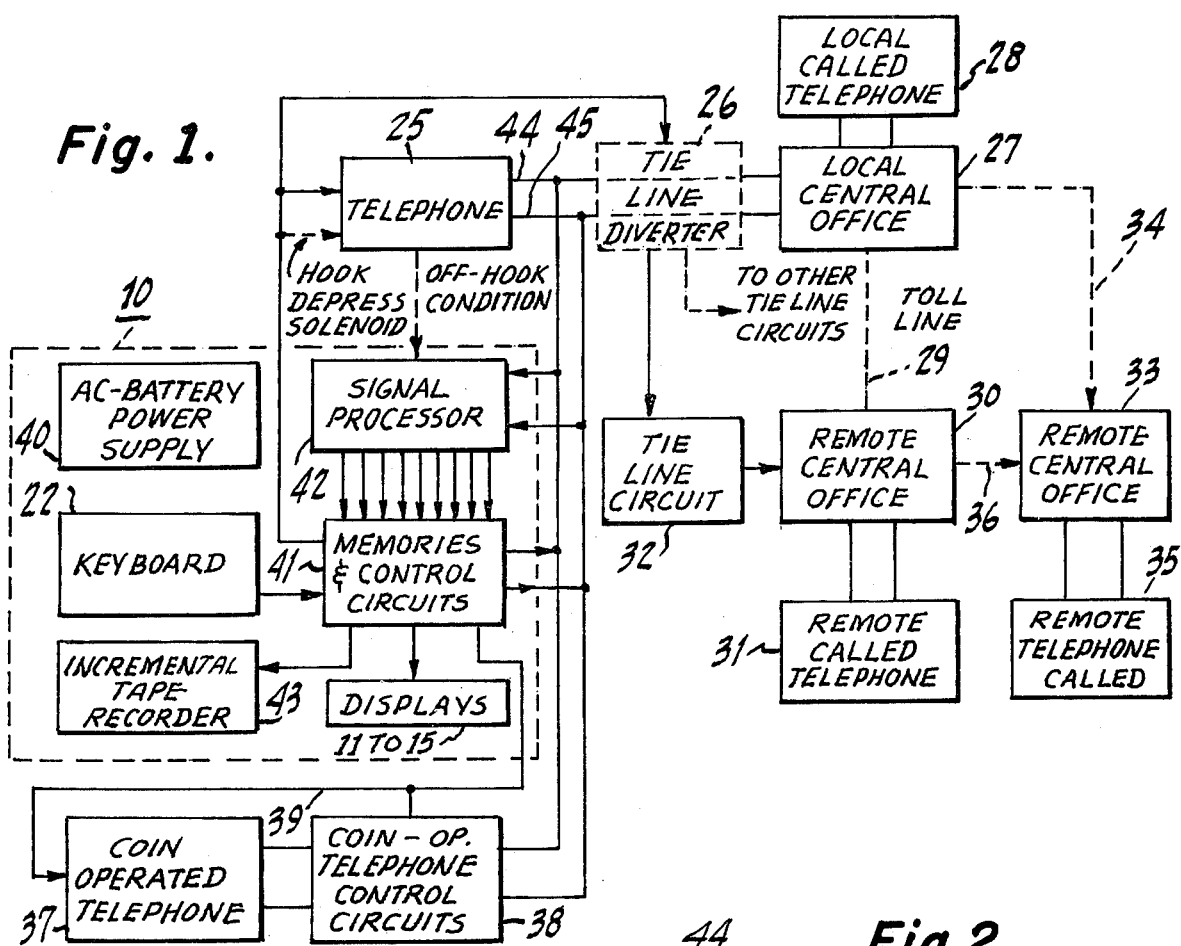
FIG. 1 shows an overall functional block diagram of a telephone call metering arrangement according to the present invention.

The overall operation of the system according to the present invention, and its various aspects, will be more clearly understood by reference to FIG. 1, which shows a functional block diagram thereof. In the system of FIG. 1, a telephone call made from a local telephone 25 is routed through a tie line diverter unit 26 to a local central office 27. Another local telephone 28, which may be called if desired, is also connected to the local central office 27.

A toll line 29 (or possibly more than one toll line) connects the local central office 27 to a remote central office 30. It is understood, of course, that in a typical telephone system there are a multiplicity of such toll lines and a corresponding multiplicity of remote central offices.

Connected to the remote central office 30 is a remote telephone 31, which may be called if desired from the telephone 25. The tie line diverter 26 is also coupled to the remote central office 30 via a tie line circuit 32. Other tie line circuits interconnect the tie line diverter 26 with other remote central offices.

The tie line diverter 26 is a switching apparatus which has the capability, when suitably actuated, of routing a telephone call from the telephone 25 directly to the remote central office 30 via the tie line 32, or to other remote central offices via corresponding other tie lines. The purpose of the tie line diverter 26 is to, under control of the metering device 10, reroute each telephone call originating with the telephone 25 through that particular tie line circuit which results in the minimum billed cost for said call. Since the tie line circuit 32 and the corresponding other tie line circuits are generally leased on a fixed price basis, the cost of any particular telephone call from the telephone 25 may be minimized by selecting that tie line circuit which is connected to a remote central office "closest" in terms of cost to the remote telephone to be called.

For example, where a call is to be placed from the telephone 25 to the local telephone 28, the cost of said call would be minimized by routing the telephone 25 directly to its corresponding local central office 27, since the called telephone 28 is also connected to said central office. However, when a call is to be placed from the telephone 25 to the remote called telephone 31, the cost of said call would be minimized by diverting the call via the tie line circuit 32, thereby reducing the incremental cost of the call to the cost of a call from one telephone associated with the central office 30 to another remote telephone 31 associated therewith.

As shown in FIG. 1, the remote central office 30 is interconnected with the remote central office 33 via a toll line 36, and the local central office 27 is interconnected with the remote central office 33 via a toll line 34. The remote called telephone 35 is connected to the remote central office 33. With this arrangement, it is clear that several alternative paths of travel are available between the telephone 25 and the remote called telephone 35, and it is not at all obvious whether it would be advantageous to utilize the tie line diverter 26 or to simply permit the call to go through the normal transmission circuit from the telephone 25 to the local central office 27 without use of said diverter. In this arrangement, the metering device 10 enables the cost of the call to be minimized by comparing the cost of a call from the telephone 25 to the remote telephone 35 with the cost from the remote end of each tie line to said remote telephone as determined by the metering device 10, i.e. by determining the initial period cost for said call.

The tie line 32 serves the purpose of "shifting" the call so that for incremental billing purposes the cost of the call is determined as though it were placed from the remote end of the tie line 32 from a corresponding associated telephone number. Therefore, the metering device 10 determines the corresponding initial period cost for a telephone call from the "end" of the tie line circuit 32 to the remote called telephone 35. The metering device 10 similarly determines the corresponding initial period cost for telephone calls from the "ends" of the other tie line circuits associated with the diverter 26, to the remote called telephone 35. Thereupon the resulting information is processed by comparison means within the tie line diverter 26, and a signal is generated indicative of the particular tie line circuit which results in lowest incremental cost for the corresponding telephone call. If desired, switching means within the tie line diverter 16 may then be automatically actuated to route the call via said lowest cost tie line circuit, to thus minimize the costs of telephone calls from the telephone 25, without operator intervention.

Alternatively, the system may be arranged so that the required metering circuitry is incorporated in the tie line diverter 26, with the metering device 10 and its associated keyboard and displays being eliminated.

According to another feature of the invention, a coin operated telephone 37 may be controlled to permit the making of and payment for long distance calls without intervention by a telephone operator. This is achieved by a coin operated telephone control circuit unit 38 which is interposed between the coin operated telephone 37 and the central office 27, and which is controlled by the metering device 10, or alternatively by metering circuitry within the unit 38 itself.

In utilizing the coin operated telephone 37, a calling party inserts a coin therein in an amount required to obtain a dial tone. He then dials a local telephone number covered by the payment of the initial coin, or another telephone number requiring an additional payment. The metering device 10 determines the initial billing rate of the other telephone call, and controls the unit 38 so that the corresponding call is not initiated until the calling party inserts sufficient additional coins or other media of payment or exchange into the telephone 37. Simultaneously, of course, the metering device 10 generates an audible or visual indication of the required payment amount, via the control line 39, so that the calling party is informed as to the amount of additional payment required. When the additional payment is made, the control unit 38 initiates the desired telephone call, which is continually monitored by the metering device 10. When the end of a billing rate period is reached, the metering device 10 once again indicates, either audibly or visually, to the calling party using the telephone 37 the amount of the additional payment required, and the call is automatically interrupted by the unit 38 if such payment is not made within a predetermined time, e.g. one minute, after such "request" for additional payment is made.

The basic operation of the metering device 10, as shown functionally in FIG. 1, is as follows:

As shown in FIG. 1, the metering device 10 comprises six principal functional units, i.e. (i) an AC-battery power supply 40, which includes a rechargeable battery which is continually maintained in a charged condition and which serves to maintain the storage of information in certain memories contained in the memory and control circuit unit 41 during momentary or temporary interruptions of the AC power supply which normally serves to provide operating power to the device 10, (ii) the aforementioned memory and control unit 41, (iii) a signal processor 42 which is utilized only in the automatic mode of operation of the device 10, (iv) the keyboard 22 shown in FIG. 3, (v) the displays 11 to 15, and (vi) an optional incremental tape recorder 43 for recording coded signals corresponding to the amounts displayed in the readouts 11 and 12 representing the total billed amount and billed time for each individual call. If desired, as previously mentioned, the B key of the keyboard 22 may be employed to also record on the recorder 43 account or file number information relating to each individual call. If this is done, processing of telephone billing information may be facilitated by removing the tape from the recorder 43 at the end of each month, and feeding said tape into a computer or other processor to provide totals for the telephone costs billed to each individual file or account number.

The incremental tape recorder 43 is one in which the magnetic tape recording medium moves incrementally, i.e. in discrete steps. At the end of each telephone call, the memory and control unit 41 provides information respecting said call which is to be recorded, to the recorder 43, and simultaneously provides a recorder start signal. When the recorder 43 receives this start signal, it steps or increments the magnetic tape, so that the tape moves through a sufficient distance to permit recording of the corresponding digital word or words respecting the completed telephone call. If the B key on the keyboard 22 is subsequently employed in conjunction with the numerical keys to enter into the memory and control unit 41 corresponding account or file number information, the unit 41 provides such information to the recorder 43, and simultaneously provides another start signal to cause the recorder to step or increment a sufficient distance, preferably equal to the distance corresponding to recorded telephone call information, to record the corresponding account or file number information.

In the manual and rate determination modes, the signals which cause the memory and control unit 41 to operate to display and/or compute corresponding billing information, are entered via the keyboard 22 as previously described. In the automatic mode, a signal processor 42 is employed to automatically generate call connection and call termination signals to cause the memory and control unit 41 to start and stop the metering of a corresponding telephone call. The signal processor is connected directly to the telephone lines between the telephone 25 and the diverter 26 or local central office 27. In addition, means such as a microswitch, reed relay, or other transducer is employed to sense the off-hook condition of the telephone 25, i.e. when the receiver is off the hook.

While the signal processor 42 may be capable of providing all of the output signals to the memory and control unit 41 which are listed in Table II, normally all of these signals will not be available or required for automatic operation.

For example, in a particular telephone system the C.P.C. (calling party control) signal and/or the line reversal signal may not be available. The signal processor may generate the off-hook condition signal as previously described, and may separate the busy signal and ring signal from other signals on the telephone line by filtering and signal separation techniques which are well known in the telephone art. The signal representing disconnection of the telephone at the called end may be generated by detecting, in well known fashion, the click which occurs when such a disconnect occurs.

The commencement of a telephone connection between the calling and called receivers may be sensed by (i) detecting the line reversal signal if available, (ii) detecting the presence of a voice on the telephone line by well known voice operated mechanism techniques, or (iii) sensing that a time has elapsed since the last ring which is greater than the time between rings, and that no busy signal or dial tone has occurred. For example, in the United States the time between rings is generally on the order of five seconds, so that when a ring occurs followed by a delay of more than five seconds without a busy signal or dial tone occurring, it may be assumed that a telephone connection between the calling and called telephones has been established.

Alternatively, all three of the aforementioned techniques may be simultaneously employed, to provide improved reliability of operation by, e.g., starting metering operation of the device 10 only when all three or two of the three aforementioned conditions are present.

Similarly, the termination of a connection between the calling and called telephones may be detected by (i) sensing the C.P.C. signal, if available, (ii) sensing the line reversal signal, if available, (iii) sensing a disconnect "click" at the called end, as previously mentioned, or (iv) detecting the absence of voice communication on the telephone line for a reasonable period of time, e.g. 15 seconds. As in the case of generation of the call connection signal, the call termination signal may be generated based on a combination of all or some of the aforementioned conditions, for improved reliability.

The busy signal is not required for basic automatic operation as previously described in the specification. However, the busy signal may, if desired, be employed in conjunction with suitable logic circuitry in the device 10, to automatically redial the called telephone after a predetermined time interval.

Since the metering device 10 is connected across the telephone lines 44 and 45, it is difficult (in the case of touch tone type telephones) or essentially impossible, in the case of conventional dial telephones, to "dial" a called telephone number via the keyboard 22 when the telephone 25 is off the hook. However, it is conventional practice, and a habit which is difficult to break, for a telephone user to first pick up the receiver before dialing the called number. To permit the metering device 10 to "dial" a called number which has been entered by the keyboard 22 and displayed via the readout 15, the memory and control unit 41 provides a hook depress solenoid signal to a solenoid attached to the telephone 25, causing said solenoid to depress the telephone hook just before the called telephone number is "dialed" by the memory and control unit 41, and to release the hook just after said dialing has been completed.

Figure 2:
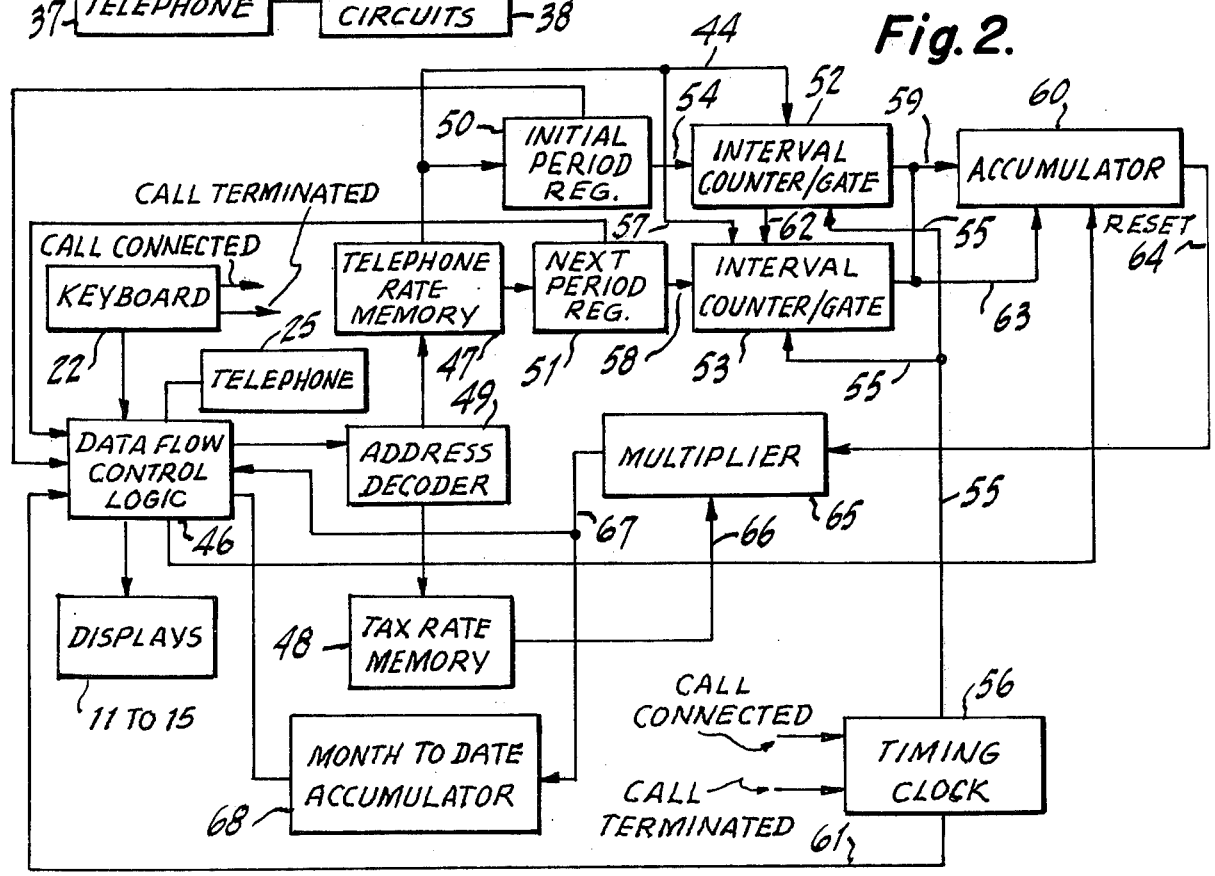
FIG. 2 is a more detailed block diagram of a manually operated embodiment of the telephone call metering device shown in FIG. 1.

A somewhat more detailed functional block diagram of a metering device of the manually operable type is shown in FIG. 2, in which entries of data from the keyboard 22 are made via the data flow control logic circuitry 46, which contains registers for storing the information which appears in the readouts 11 to 15, and a memory for storing the calling number, which changes only infrequently. The following example will illustrate the operation of the metering device shown in FIG. 2 in connection with the metering of a particular phone call.

The device shown in FIG. 2 is manufactured with a read-only telephone rate memory 47, and a read-only tax rate memory 48. Such memories, which are known in the art, store information in digital form in a nonvolatile storage medium, so that the stored information is maintained regardless of the presence or absence of a supply of electrical power to the device. Normally, the memories 47 and 48 will be identical for all devices utilized within a given telephone area designated by a single area code. For example, all devices utilized within the 516 area (Nassau and Suffolk Counties, New York, U.S.A.) would employ the same memories 47 and 48. The telephone rate memory 47 has two sections, viz. (i) a "local" section covering telephone calls from one point in the 516 area to another point in the same area, and (ii) a long distance section covering calls from a device within the 516 area to another telephone having a different area code. The telephone rate memory 47 is able to discriminate between these two types of calls, because the first three digits of a "local" telephone number are different from the first three digits of any area code designation number.

Initially, using the C11 access code indicated in Table I above, the number of the calling telephone, i.e. the telephone with which the device shown in FIG. 2 is associated, is entered into a register in the data flow control logic unit 46. This calling number is "permanently" stored therein. For example, such information may be stored in a register comprising metal-oxide-semiconductor transistors, requiring very little power for operation, with power being continuously supplied thereto via an AC-battery power supply arrangement similar to the supply 40 described in connection with FIG. 1. When the number to be called has been entered into the register therefor within the unit 46, and is displayed on the readout 15, depression of the # key causes the information from the calling and called registers of the unit 46 to be transferred to the address decoder 49, which utilizes the combination of calling and called numbers to address the memories 47 and 48. When so addressed, the telephone rate memory 47 provides four output "words" corresponding to the telephone call made or to be made between the calling and called phone, each of these "words" corresponding to the information displayed in the readouts 11 to 14, with the light 16 illuminated.

More specifically, when the particular location or call in the memory 47 corresponding to the call between the calling and called telephones is addressed, the memory 47 outputs digital signals corresponding to (i) the initial billing rate to the initial period register 50, (ii) the next period billing rate to the next period register 51, (iii) the initial billing period to the interval counter/gate 52 and (iv) the next period duration to the interval counter/gate 53. The initial period register 50 then stores therein a digital "word" corresponding to the initial billing rate, and the next period register 51 stores therein a digital word corresponding to the next period billing rate. The input from the memory 47 to the counter/gate 52 on line 54 sets the interval counter to the number of minutes corresponding to the initial period. That is, if for example the initial period were three minutes, the interval counter/gate 52 would be set to gate out the input signal thereto on line 54 until receiving three timing pulses on line 55 from the timing clock 56.

Similarly, the digital word corresponding to the next period duration appears on line 57 and sets the interval counter/gate 53 to count a corresponding number of timing pulses on line 55 before gating the input signal on line 58 thereto to the output line 59 thereof, both output lines 59 of the counters 52 and 53 being coupled to the input terminal of a digital accumulator circuit 60.

The timing clock 56 provides timing pulses at one minute intervals on line 55 to the counters 52 and 53, as previously mentioned. These timing pulses commence with receipt of the "call connected" signal from the keyboard 22, which is generated when the * key is depressed as previously described. The timing clock 56 continues to generate timing pulses at one minute intervals on line 55, and simultaneously outputs a digital word corresponding to the call duration to the data flow control logic unit 46 on line 61, until receipt of a "call terminated" signal from the keyboard 22. The "call terminated" signal is generated by depressing the # key in the manner previously described.

Assume, for example, that the initial period register 50 contains a digital word corresponding to $5.00, that the interval counter 52 is set by the signal on line 44 for a three minute count, that the next period register 51 contains a digital word corresponding to $1.00, and that the interval counter 53 is set to count one minute intervals, i.e. to gate the signal on line 58 through to line 59 each time a clock pulse appears on line 55. The interval counter 53 does not become operative until it receives an enable signal from the counter 52 on line 62. This enable signal is generated at the same time that the interval counter/gate 52 reaches its full count, i.e. three minutes after receipt of the call connected signal by the timing clock 56. The operation of the interval counter/gate 52 is such that during the first three minutes of the call, according to the above example, the contents of the initial period register 54 are inputed to the accumulator 60 on line 59, so that the accumulator 60 stores digital information during these first three minutes which corresponds to the word contained in the initial period register 50. After this three minute period (or whatever period the counter 52 is set for by the signal on line 44), the output of the interval counter/gate 52 becomes 0, and an enable signal is generated to the interval counter/gate 53 on line 62, to enable the counter/gate 53 to commence operation, with a count cycle determined by the next period duration signal on line 57.

As soon as the interval counter/gate 53 is enabled, it couples the digital word stored in the next period register 51 are incrementally added to the contents of the accumulator 60 at one minute intervals, so that the contents of the accumulator 60 are incremented according to the cost of each additional "next period". Thus the contents of the accumulator 60 appearing on output line 64 correspond to the total cost of the particular telephone call made or to be made.

At the same time the address decoder 49 is addressing the telephone rate memory 47, it addresses the tax rate memory 48 with respect to the same telephone call to cause the memory 48 to output to a multiplier 65 on line 66 a digital signal corresponding to the rate of tax applicable to the particular telephone call made or to be made. The tax rate memory 48 may contain a single tax rate corresponding, e.g., to Federal tax, or alternatively may contain a composite tax rate corresponding to the combined Federal, State and local tax applicable to the particular cell.

The digital multiplier 65, which may be a digital computer type serial or parallel multiplier circuit well known in the art, multiplies the tax rate signal on line 66 by the call cost signal on line 64 to provide a modified call cost signal on line 67 representing the total cost of the telephone call including tax. This total cost signal on line 67 is coupled through the data flow control logic unit 46 to the readout 11 to indicate the total current cost of the applicable telephone call. At the same time, the call duration signal from the timing clock 56 on line 61 is coupled to the readout 12 to indicate the corresponding billed time for said call.

The output of the multiplier 65, representing total current call cost, is also coupled to the month to date accumulator 68, which is a digital accumulator similar to the accumulator 60, with the accumulator 68 storing in non-volatile form the total cost of all telephone calls made utilizing the device shown in FIG. 2, from the beginning of the corresponding month to the current time.

Conventional addressing and display logic circuits within the unit 46 permit the contents of the registers within the unit 46, the accumulator 60 and month to date accumulator 68, the call duration register within the timing clock 56, and any desired cell of the memories 47 and 48, to be displayed on the appropriate ones of the readouts 11 to 15 and to be modified, if desired, via the keyboard 22 in accordance with Table I above.

Figure 4:
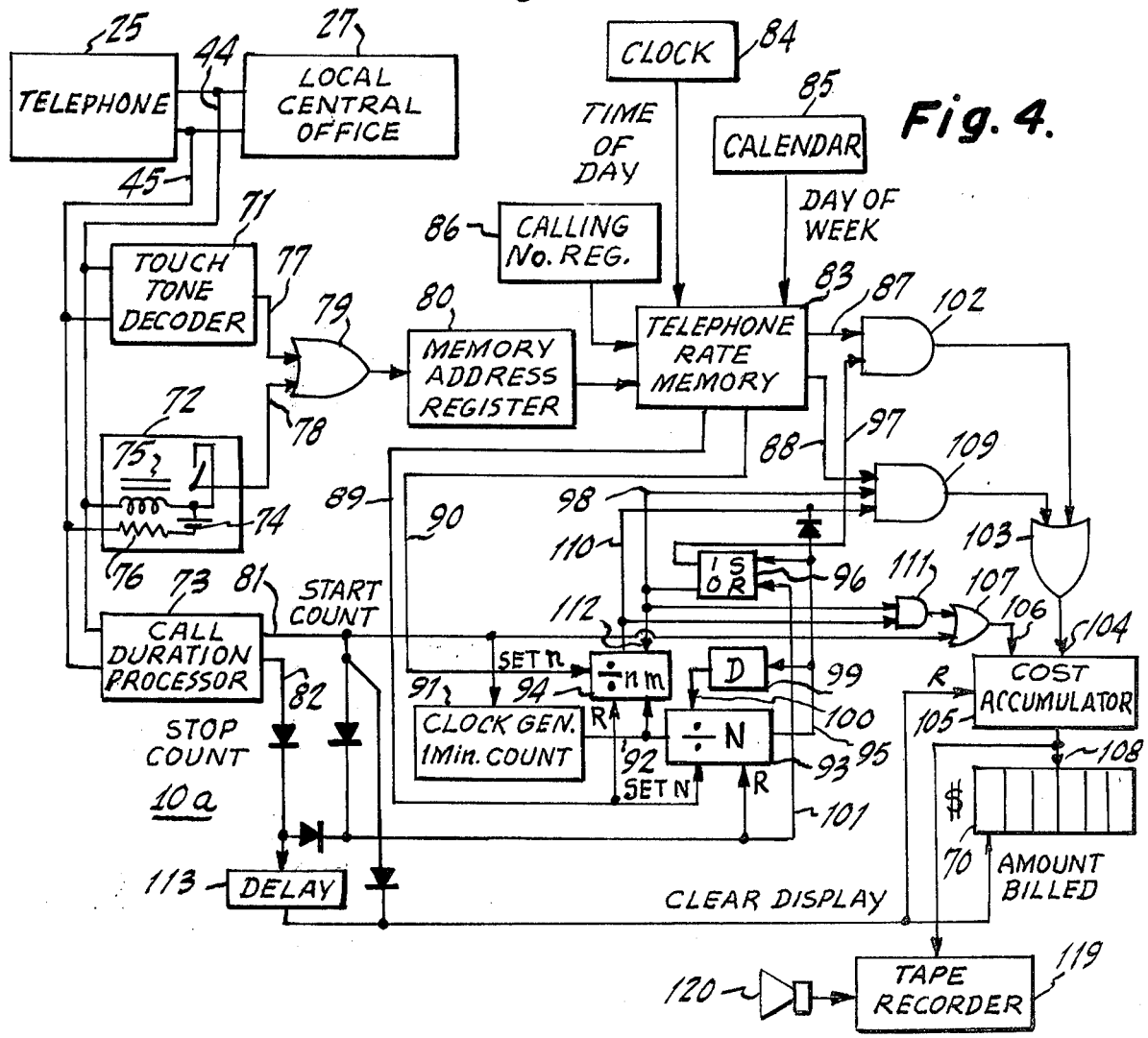
FIG. 4 shows a telephone call metering arrangement according to a modified embodiment of the invention.

FIG. 4 shows an alternative form 10a of the cost metering device 10 shown in FIGS. 1 and 2.

In the cost metering device 10a, no keyboard is employed, and there is only a single display 70, which shows only the accrued amount billed for a telephone call in progress or just completed.

The metering device 10a is connected to the lines 44 and 45 which couple the telephone 25 to the local central office 27. The telephone transmission lines 44 and 45 are coupled to (i) a touch tone decoder 71, (ii) a rotary dial interface unit 72, and (iii) a call duration processor 73. The touch tone decoder 71, which is well known in the art, converts touch tone dialing signals on lines 44 and 45 (in the event the telephone 25 is of the touch tone type) to a corresponding digital pulse train which represents the number being dialed from the telephone 25, in digital form.

In the event the telephone 25 is of the conventional rotary dial type, dialing is accomplished by intermittently short-circuiting the lines 44 and 45, in a time sequence corresponding to the number being dialed. The rotary dial interface unit 21 employs a series connected battery 74, sensitive relay 75, and resistor 76, to sense the intermittent short-circuiting of the lines 44 and 45 while dialing is in progress, and to generate a corresponding digital pulse train representing the dialed number in a coded form.

The touch tone decoder and rotary dial interface unit outputs on lines 77 and 78 respectively, are coupled through an OR gate 79 to a memory address register 80, which stores the number being called in digital form.

The call duration processor 73 has input terminals connected to the telephone transmission lines 44 and 45, and processes signals present on said lines, as previously discussed, to provide (i) a start-count signal on line 81 which corresponds to the time of establishment of a connection between the calling telephone 25 and the telephone being called, and (ii) a stop-count signal on line 82 which corresponds to the time of termination of said connection. Alternatively, the call duration processor 73 may be eliminated, and manually operated switches provided to generate the start-count and stop-count signals.

The memory address register 80, containing information as to the number being called, is coupled to address a corresponding memory cell within the telephone rate memory 83, which is a multi-section memory having (i) various rate portions for different times of the day that a call is being made and (ii) other rate portions for different days of the week that the call is being made. For example, in the United States there are presently three different rates for calls made (i) between 9:00 a.m. and 5:00 p.m., (ii) between 5:00 p.m. and 11:00 p.m., and (iii) between 11:00 p.m. and 8:00 a.m. In addition, rates are different between 8:00 a.m. and 11:00 p.m. on Saturday, Sunday, and certain holidays. The clock 84 provides a digital coded signal to the telephone rate memory 83 corresponding to the time of day, while the electronic calendar 85 provides a digital signal to the telephone rate memory 83 corresponding to the day of the week, i.e. Monday, Tuesday, etc. Therefore, the telephone rate memory 83 may determine the particular rate which is applicable for the time of day and day of the week at which the call is made.

When the metering device 10a is installed in association with the calling telephone 25, the telephone number of the telephone 25 is entered into a non-volatile calling number register 86, which may be in the form of a magnetic memory, preset switches, etc. The telephone rate memory 83 is thus addressed by both the calling telephone number (from the register 86) and the telephone number which is being called (from the register 80). The corresponding outputs of the rate memory 83, in digital form, are (i) the initial period billing rate on line 87, (ii) the next period billing rate on line 88, (iii) the initial period duration on line 89, and (iv) the next period duration on line 90.

A clock generator 91 provides timing pulses on output line 92 thereof at one minute intervals, commencing one minute after receipt of the start-count signal on line 81 from the processor 73. This output signal on line 92 is divided or counted by (i) a counter 93 having a count capacity N set by the initial period duration signal on line 89, and (ii) another counter 94 which has a count capacity N set by the next period duration signal on line 90. Therefore the counter 93 generates an output pulse on line 95 a number of minutes after occurrence of the start-count signal on line 81, which number of minutes corresponds to the initial billing period. That is, if the initial billing period is, e.g. four minutes, the counter 93 is set by the signal on line 89 to a count capacity of four, so that the output signal on line 95 occurs four minutes after the start-count signal on line 81.

The output signal on line 95, which occurs at the end of the initial billing period, sets the telephone rate gate 96 to provide a logical zero output on line 97 and a logical one output on line 98, and, via a delay circuit 99, provides a signal on line 100 which disables the counter 93, so that the outputs of the gate 96 do not thereafter change for the duration of the corresponding telephone call.

Since the gate 96 has been initially reset by the reset signal on line 101, by either the stop-count signal for the previous call, on line 82, or the start-count signal for the current call on line 81, the output of gate 96 on line 97 is a logical one for the duration of the initial billing period, and a logical zero thereafter. Similarly, the output of the gate 96 on line 98 is a logical zero for the initial billing period and a logical one thereafter. Thus, via the AND gate 102, and the OR gate 103, the initial period billing rate on line 87 is coupled to the data input terminal 104 of the cost accumulator 105. When the start-count signal occurs on line 81, it is coupled to the enable terminal 106 of the accumulator 105, through the OR gate 107, to cause the accumulator 105 to "add in" the initial period billing rate data at terminal 104, so that during the initial billing period of the corresponding telephone call the contents of the accumulator 105 correspond to said initial period billing rate. These contents are coupled to the display 70 via line 108, so that the initial period billing rate is displayed for the duration of the initial billing period of the corresponding call.

At the end of the initial billing period, a pulse or level change occurs at output line 95 of initial period counter 93, causing the gate 96 to be set so that a logical zero appears on line 97, thus causing the output of AND gate 102 to become zero (or its equivalent).

Simultaneously, the output of gate 96 on line 98 changes from logical zero to logical one, providing an enabling input signal to the AND gate 109 on line 98, and simultaneously providing another enabling input to sand AND gate 109 on line 110. Thus all inputs to AND gate 109 are enabled, causing the next period billing rate data on line 88 to be coupled to terminal 104 of accumulator 105 via AND gate 109 and OR gate 103. At the same time, the signal on line 95 (corresponding to the end of the initial billing period) is coupled to the AND gate 111 via line 110, which AND gate 111 is enabled by the logical one present on line 98 at this time, so that an enabling signal is delivered to terminal 106 of accumulator 105 via AND gate 111 and OR gate 107, causing the accumulator 105 to "add in" the next period billing rate data on line 104, so that the contents of the accumulator 105 now correspond to the cost of the initial billing period plus the cost of the next billing period. The total cost as of that time, i.e. the current cost of the telephone call in progress, is then coupled to the display 70 via line 108.

The signal on line 98 is also coupled to the enable terminal 112 of the next period duration counter 94, so that at the end of the initial billing period the counter 94 begins to operate, i.e. to start counting timing signals from the clock generator 91 on line 92. At the end of the first "next billing period", an output signal is generated by the counter 94 on line 110, enabling the AND gates 109 and 111, and causing the next period billing rate data on line 88 to be coupled through the AND gate 109 and the OR gate 103 to terminal 104 of accumulator 105, and at the same time generating an enable signal at terminal 106 of accumulator 105, (via AND gate 111 and OR gate 107), so that the next period billing rate data is again "added in" to the accumulator 105, to increase the contents of the accumulator accordingly, so that the cost of the corresponding next period is added to the previous accumulator contents, which are coupled to the display 70 via line 108, to indicate the current cost of the telephone call in progress.

Similarly, at the end of each subsequent next billing rate period, the next period billing rate data on line 88 is again added to the contents of the accumulator 105, to thereby "update" the contents of the accumulator 105 and display 70, so that the display 70 shows the cost of the telephone call in progress, on a current basis.

When the end of the telephone call is reached, at the termination of the telephone call, the stop-count signal appears on line 82, and resets the counters 93 and 94 and the gate 96. Through a delay circuit 113 the stop-count signal clears the accumulator 105 and the display 70 a predetermined period of time (typically on the order of 5 to 60 seconds) after termination of the call. To insure that all circuitry of the metering device 10a is properly initialized, the start-count signal on line 81 for the next call also resets the counters 93 and 94, gate 96, accumulator 105 and display 70. The memory address register 80 clears itself upon receipt of the first input pulse via the OR gate 79.

Although the telephone rate memory 83 of FIG. 4, as well as the corresponding memory 47 of FIG. 2, providing accurate telephone rate information, the memory capacity required is rather high, since, for the United States by way of example, there are over 100 long distance dialing areas having corresponding three digit area codes, and numerous central offices within each region designated by a given area code. Thus there are obviously thousands upon thousands of combinations of areas and many more combinations of central offices between which calls can be made, with corresponding applicable billing rates. Thus the memory capacity of the telephone rate memories 83 and 47 must necessarily be quite large.

For telephone networks such as those in the United States, where long distance billing rates are dependant upon the distance (usually in rate airline miles) between the calling and the called telephone central offices, the required capacity of the telephone rate memory may be substantially reduced by use of a coordinate system which enables the computation of the distance between the calling and called central offices. This technique will be more readily understood by reference to FIG. 5, which shows the applicable portion of the device 10a of FIG. 4 for utilization of this alternative billing rate memory technique.

Figure 5:
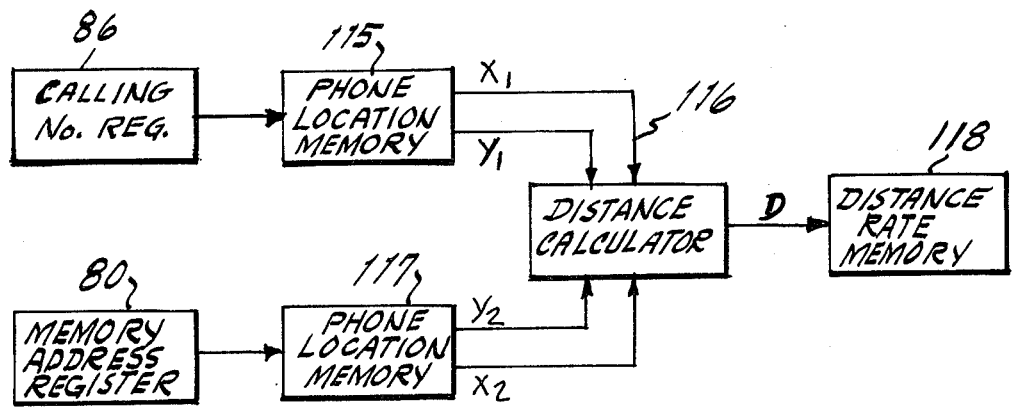
FIG. 5 shows an alternative telephone rate memory arrangement for the modified embodiment shown in FIG. 4.

As shown in FIG. 5, the digital code corresponding to the calling telephone number, from the register 86, is employed to address a phone location memory 115. The phone location memory 115 provides, for each central office, a corresponding $X_1$, $Y_1$, coordinate location, which may for example represent the distance between the central office and an arbitrary origin, or reference point, with the $X_1$ coordinate representing the lateral distance, i.e. in rate airline miles measured along a line of constant latitude, and the $Y_1$ coordinate representing the "vertical" distance, i.e. the distance from the central office to said origin, measured along a line of constant longitude. The corresponding $X_1$, $Y_1$, coordinates of the calling central office are fed to a distance calculator 116.

Similarly, digital data corresponding to the telephone number being called, contained in the register 80, is utilized to address an identical phone location memory 117, to generate corresponding $X_2$, $Y_2$ coordinates for the called central office, these coordinates also being coupled to the distance calculator 116. Alternatively, a single phone location memory may be employed, with the memory either being simultaneously addressed by the registers 86 and 80, or multiplexed therebetween in a manner well known in the art.

The distance calculator 116 then computes the distance D (in rate airline miles) between the central offices corresponding to the data contained in the registers 86 and 80, according to the equation:

$$D = \sqrt{(X_1 - X_2)^2 + (Y_1 - Y_2)^2} \qquad (1)$$

The corresponding calculated distance D between the calling and called central offices is then coupled to a distance rate memory 118, in which is stored the billing rate information (initial billing rate, initial period duration, next period billing rate, next period duration) for various distance ranges, from the smallest range (normally zero to ten miles) to the greatest distance range. Thus the distance rate memory 118 need merely store billing rate information corresponding to a limited number of distance range values.

As indicated in FIG. 4, if desired, the total cost information for each telephone call made from the telephone 25, may be coupled from line 108 to a tape recorder 119, to record the cost of each call in digital form on magnetic tape within said tape recorder. Alternatively, or, if desired, at the same time, a parallel track on the tape recorder 119 (i.e. parallel to the track containing the total cost data from line 108) may be provided to record voice information entered by the calling party via the microphone 120, as to the cost of the call, the file or account number to which the cost of the call is to be charged, notes respecting the call, etc.

Figure 6:
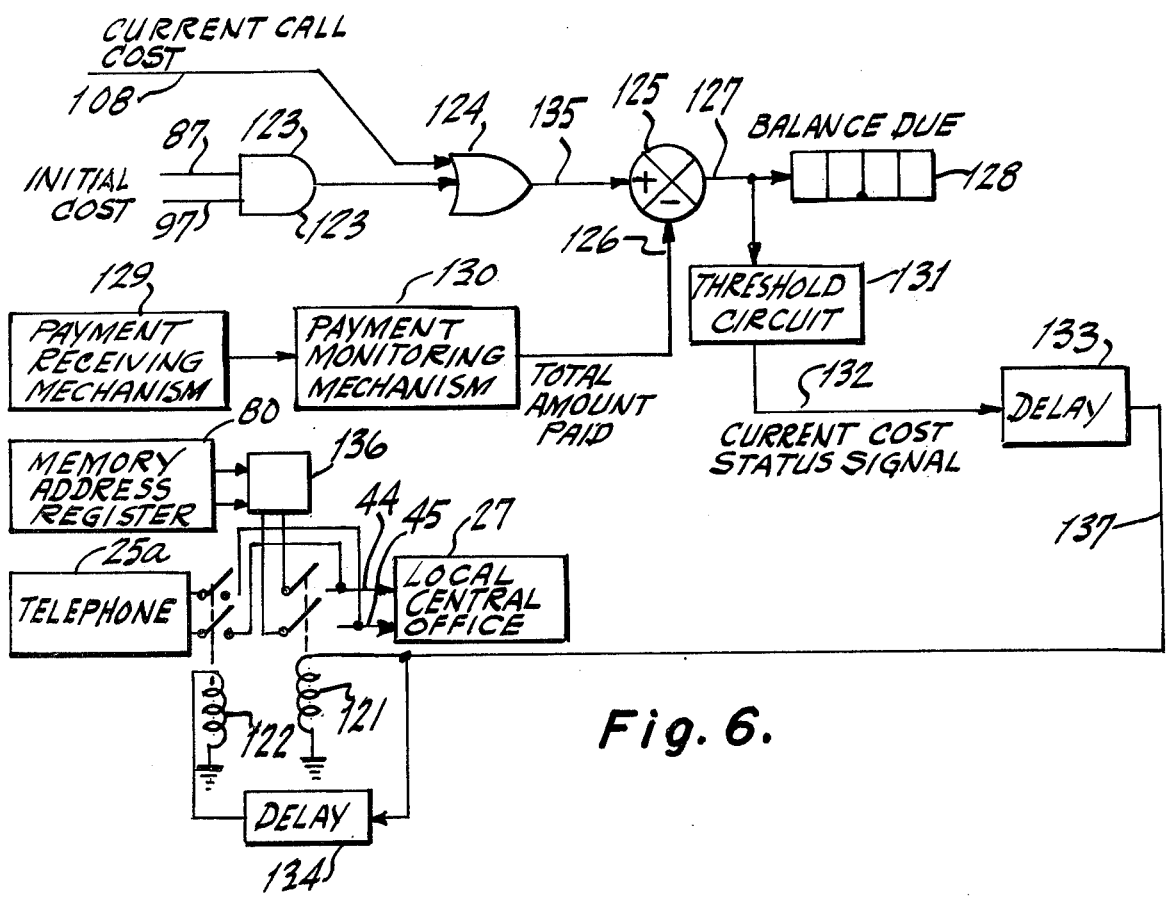
FIG. 6 shows a modification of the circuit shown in FIG. 4, for use with a coin-operated telephone.

FIG. 6 shows a modification of the device of FIG. 4, suitable for use with a coin operated telephone. The metered coin operated telephone in FIG. 6 comprises all elements shown in FIG. 4 (except tape recorder 119 and microphone 120), with the same numerals being used to identify the same items.

In the coin operated arrangement shown in FIG. 6, the telephone 25a corresponds to the telephone 25 of FIG. 4, but is of the coin operated type. By the term "coin operated" as herein employed is meant not only a telephone which is operated by receipt of metallic coins or tokens, but rather any telephone which is operated upon insertion therein or coupling thereto of a medium of exchange or payment, including but not limited to currency, credit cards, etc.

A first relay 121 serves to selectively couple the memory address register 80 to the local central office 27 via the telephone transmission lines 44 and 45, the relay 121 having normally open contacts as shown in FIG. 6. Similarly, a second relay 122 serves to couple the coin operated telephone 25a to the local central office 27, the relay 122 also having normally open contacts.

Initially, the calling party dials (by use of touch tone keys, a conventional rotary dialing mechanism, or other apparatus) the telephone number of the party to be called, and said number is entered into the memory address register 80 as previously described. The register 80, together with the calling number register 86, then addresses the telephone rate memory 83 to generate a digital signal on line 87 corresponding to the initial cost of the telephone call to be made. This initial cost signal on line 87 is coupled as an input to the AND gate 123, the other input of which is line 97, which is in a logical one state, as previously described, during the initial period of the call. Thus the initial cost signal 87 is coupled through the AND gate 123 and OR gate 124 to a cost comparator 125. Since there is no enable input to terminal 106 of accumulator 105 at this time, there is no current call cost signal present on line 108.

Also, since no payment has yet been made to the coin operated telephone 25a, the input signal to the comparator 125 on line 126, representing the total amount paid, is zero, so that the output of the comparator 125 on line 127 corresponds to the initial cost of the call as indicated by the signal on line 87. This initial cost is displayed in the "balance due" display 128, to advise the calling party of the initial cost of the call.

The calling party then places payment, in at least the amount of the balance due, in the payment receiving mechanism 129, which may be a coin chute, credit card reading device, or other payment receiving means. The payment receiving mechanism 129 is coupled to a payment monitoring mechanism 130, which in known fashion produces a digital output signal on line 126 corresponding to the amount which has been paid into the payment receiving mechanism 129. As payment is made, the output of the comparator 125 on line 127 decreases, i.e. successively indicates lower values of balance due.

For example, if the initial cost of a call is $1.00, the balance due readout 128 would initially indicate said sum of $1.00. If thereafter a 25 cent piece, or quarter, were placed in the payment receiving mechanism 129, the signal on line 126 would increase from zero to 25 cents, and the balance due readout 128 would decrease from $1.00 to $.75.

After sufficient payment has been made to the payment receiving mechanism 129 to bring the total amount paid, as indicated by the digital data signal present on line 126, up to a value equal to the initial cost of the call, the output of the comparator 125 becomes reduced to zero, causing the threshold circuit 131 to generate a current cost status signal on line 132 indicating that the cost of the corresponding portion of the telephone call has been paid. This current cost status signal, via a delay circuit 133, actuates the relay 129 and, via another delay circuit 134, actuates the relay 122 thereafter.

The current cost status signal remains present on line 132 so long as the signal on line 126 indicating the total amount paid equals or exceeds the signal on line 135 indicating the current cost of the call in progress.

The relay 121 is of the latching time delay type, so that when the current cost status signal actuates the relay 121, said relay engages and remains engaged for a sufficient period of time to allow the contents of the memory address register 80 to be fed to the local central office 27 via transmission lines 44 and 45, through a line coupler 136, in serial fashion to permit the data respecting the called number contained in the register 80, to "dial" said number through the local central office 27. The purpose of the line coupler 136 is to convert the digital data signals from the register 80 into signals which correspond to either those generated by a conventional rotary dial telephone or those generated by a touch tone telephone, as desired. The latching delay relay 121, as discussed above, remains engaged for a sufficiently long period of time to enable complete "dialing" of the called number through the central office 27. At the end of this "dialing" time interval, the relay 121 deactivates, and the contacts associated therewith return to their normally open position.

The delay circuit 134 delays actuation of the relay 122 until just after disengagement of the relay 121. Alternatively, a switch contact associated with disengagement of the relay 121 may be employed to energize the relay 122 just after the relay 121 disengages.

Engagement of the relay 122 connects the telephone 25a to the local central office 27 via transmission lines 44 and 45 to permit the connection of the calling telephone 25a to the telephone being called. As soon as the connection is established, the start-count signal is generated on line 81 and, as previously explained in detail, a current call cost signal is generated on line 108, which represents the current cost of the telephone call in progress. Since initially the current call cost signal on line 108 is the same as the initial cost signal on line 87, the output of OR gate 124 on line 135 remains unchanged. After the initial billing period has expired, the signal on line 97 reverts to logical zero, so that the output of AND gate 123 becomes zero, and the current call cost signal 108 is the only signal coupled to the comparator 125. Thereafter, as the cost of the call increases, the value of the digital data on line 108 representing the current cost of the call increases correspondingly, as does the output of the comparator 125 and the value displayed in the balance due readout 128.

As soon as the current call cost signal on line 108 increases to a value greater than the total amount paid as indicated by the signal on line 126, a balance due value appears in the readout 128, and the threshold circuit 132 switches so that the current cost status signal on line 132 disappears. Thus, if payment is not made within a predetermined time period thereafter, said time period being determined by the delay circuit 133, some time thereafter the relay 122 becomes deactuated, disconnecting the calling telephone 25a from the transmission lines 44 and 45, and thereby terminating the call.

The delay circuit 133 is preferably of the retriggerable type known in the art, so that the output thereof on line 137 remains present so long as the input to the delay circuit 133 on line 132 is interrupted for less than a predetermined time period. In the instant case, the permissible signal interruption time of the current cost status signal on line 132 may be on the order of one minute. That is, so long as the current cost status signal is interrupted for periods of time less than one minute, the output signal of the delay circuit 133 on line 137 will remain continuously present, so that the telephone call in progress will not be interrupted. This gives the calling party approximately one minute to pay to the payment receiving mechanism 129 the balance due for the call, so that the call will not be cut off by deactuation of the relay 122. If the calling party makes payment of the balance due within the one minute time period, the total amount paid as indicated by the payment monitoring mechanism 130 on line 126, will rise to a value equal to the current call cost as indicated by the signal on line 135, thus reducing the output of the comparator 125 on line 127 to zero, and permitting the threshold circuit 131 to again provide the current cost status signal on line 132.

Figure 7:
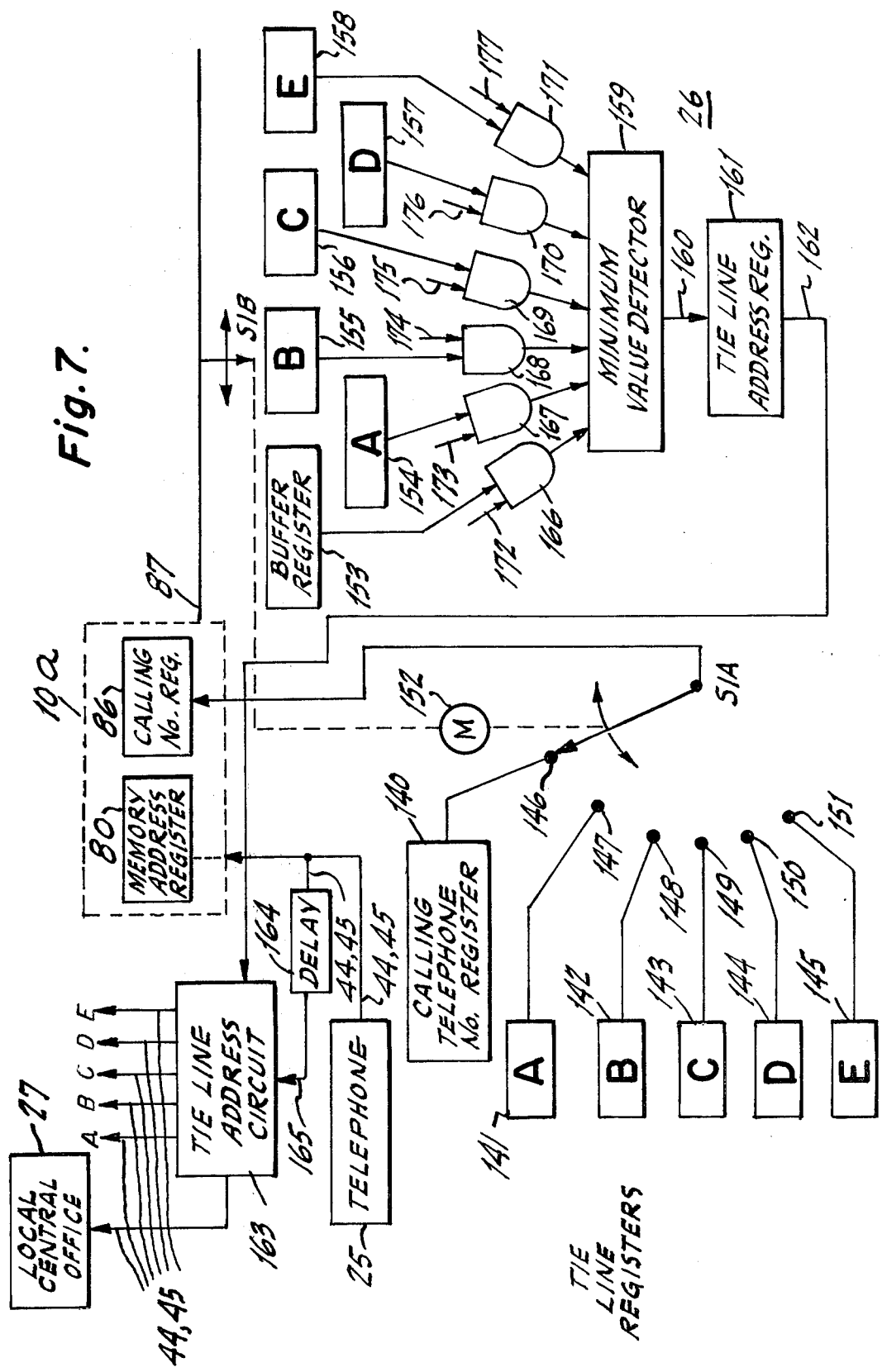
FIG. 7 shows a modification of the circuit shown in FIG. 4, for use with a telephone call diverter arrangement.

The operation of the tie line diverter 26 shown in FIG. 1 is more clearly illustrated in the functional block diagram of FIG. 7. The diverter 26 utilizes the functional elements 71, 72, 79, 80, 83, and 86 interconnected as shown in the metering device 10a of FIG. 4. The telephone rate memory 83, however, need only store data respecting the initial billing rate for each telephone call to be made. When the memory 83 is addressed by the registers 80 and 86, the digital data corresponding to said initial billing rate appears on line 87.

Insofar as the above mentioned circuitry of the metering device 10a is concerned, the device operates in the manner previously described to provide an initial period billing rate signal on line 87 corresponding to a telephone call from (i) the calling number contained in the register 86 to (ii) the called number contained in the register 80. However, instead of containing only a fixed calling number corresponding to the number of the telephone 25, the register 86 is now operated, as shown in FIG. 7, to sequentially store different "calling numbers" corresponding not only to the number of the telephone 25, but also to the number associated with the remote end of each of the tie line circuits A, B, C, D and E. Thus, the metering device 10a sequentially provides digital data signals on line 87 corresponding to the initial cost of telephone calls from (i) the telephone 25 to the called telephone the number of which is encoded in the register 80, via normal telephone network paths, and (ii) the remote end of each of the tie lines A to E to the called telephone. From these various initial cost signals, that signal corresponding to the lowest cost value is selected, and the transmission lines 44 and 45 of the telephone 25 are coupled to that line which provides the lowest cost for the call.

More specifically, the telephone number of the calling telephone 25 is entered in a calling telephone number register 140, while the telephone numbers associated with the remote ends of the tie lines A through E are entered into corresponding registers 141 to 145. The data transmission lines coupled to the registers 140 to 145 are connected to switch terminals 146 to 151 of a first portion S1A of a scanning switch S1, which is caused to repetitively scan the terminals 146 to 151 under the control of a scanning motor 152. The switch S1 may be a rotary switch rotated by the motor 152, a stepping relay operated by said motor or by a stepping solenoid, or an electronic switch or multiplexer scanner the construction of which is well known in the art.

Simultaneously with the scanning of the terminals 146 to 151 by the switch portion S1A, corresponding buffer registers 153 to 158 are scanned by a portion S1B of the switch S1, in synchronism with the scanning operation of the switch portion S1A, the switch portion S1B also being scanned by the motor 152 or one of the other arrangements mentioned above.

Thus, during the scanning of the switch S1, when the switch portion S1A is coupled to terminal 146 to enter the calling telephone number into the calling number register 86, the corresponding initial billing rate for a call between the calling number and the called number through the normal telephone transmission network, appears on line 87 and is stored in the buffer register 153. When the switch portion S1A then moves to scan the terminal 147, the telephone number corresponding to the remote end of the tie line A is entered into the calling number register 86, and the corresponding initial cost of a telephone call from said remote end to the called number (entered in the memory address register 80) is stored in the buffer register 154. Similarly, as the switch S1 continues to scan, digital data corresponding to the costs of telephone calls from the remote ends of the tie lines B to E is entered into each of the buffer registers 155 to 158 respectively.

The various digital signals from the registers 153 to 158, corresponding to initial costs of telephone calls utilizing the corresponding transmission means, are coupled to a minimum value detector 159, which compares the values of the digital cost signals from the registers 153 to 158, to provide an output signal on line 160 which corresponds to the particular one of the registers 153 to 158 containing digital information corresponding to the lowest call cost for the call being made. This signal on line 160 is coupled to a tie line address register 161, which provides a tie line selection code signal on line 162 indicating the particular one of the tie lines A to E (if any) which corresponds to the minimum cost of the telephone call being made.

The telephone 125 has the transmission lines 44, 45, thereof coupled to a tie line address circuit 163 through an analog delay circuit 164. The purpose of the delay circuit 164 is to delay coupling of the dialed signal from the telephone 25 to the tie line address circuit 163 until the scanning switch S1 has completed at least one scan of the terminals 146 to 151 and 153 to 158, and a tie line address signal has been generated on line 162. The delay circuit 164 may, e.g., comprise an endless loop of magnetic tape having a write head driven by the signals on lines 44, 45 from the telephone 25, and a read head spaced apart from the write head, with the speed of movement of the tape and the distance between the read and write heads determining the delay time. Such a delay circuit is well known in the art, and is therefore not explained in further detail here.

The tie line address circuit 163 is a mechanical or electronic switch arrangement which utilize the tie line address signal on line 162 to couple the delayed transmission line signals from the telephone 25 on line 165 to either the local central office 27 or a designated one of the tie lines A to E, as determined by the tie line address signal to the circuit 163 on line 162.

Thus the tie line diverter illustrated in FIG. 7 serves to automatically route a telephone call on transmission lines 44 and 45 originating from the telephone 25, to either the local central office 27 or one of the tie lines A to E, to achieve the lowest incremental cost for the telephone call being made. This is accomplished without the need for the calling party to do anything other than operate the telephone 25 in the normal manner.

Although not illustrated in FIG. 7, additional terminals could be provided for the scanning switch portions S1A and S1B to permit the scanning of additional calling telephone number registers 140 corresponding to additional telephones 25, so that a single tie line diverter circuit could determine the optimum routing of telephone calls originating from a number of telephones. With such an arrangement, it would, of course, be necessary to provide a separate delay circuit 164 and tie line address circuit 163 for each telephone to be so served.

The buffer registers 153 through 158 are coupled to the minimum value detector 159 through respective AND gates 166 to 171, with a corresponding Not Busy signal being coupled to the other input terminal of each corresponding AND gate. Thus, the cost signal from any one of the buffer registers 153 to 158 which corresponds to a telephone transmission path which is busy, is not coupled to the minimum value detector 159.

For example, assume that the telephone 25 is used to dial a called number, and the tie line address register 161 provides an address signal on line 162 which causes the address circuit 163 to route the call through the local central office 27. If a busy signal appears on the line, the corresponding Not Busy signal on line 172 becomes a logical zero, so that the cost signal from the register 153 is no longer coupled to the minimum value detector 159. The minimum value detector circuit 159 will then compare the cost signals thereto from the registers 154 to 158 to select that register which has the minimum cost, and a corresponding address signal will appear on line 162 to cause the address circuit 163 to select the corresponding one of the tie lines A to E. In similar fashion, any tie line which is busy will, via the corresponding Not Busy signal on the applicable one of the lines 173 to 177, cause the minimum value detector 159 to compare only the cost signals for transmission paths which are available, with the address signal on line 162 making the address circuit 163 switch the transmission signals from the telephone 25 to the available transmission path which provides the minimum incremental cost for the calls being made.

Figure 8:
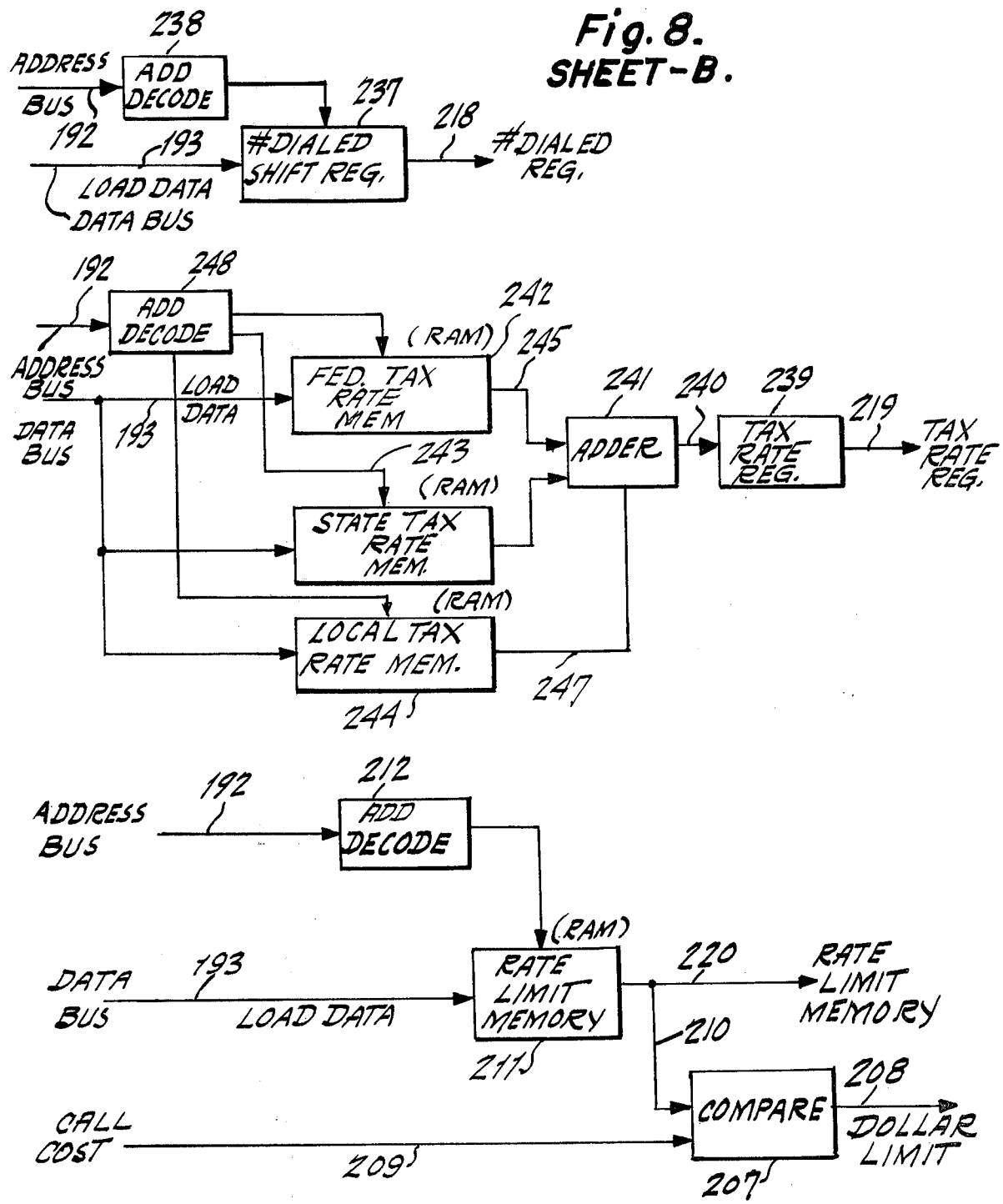
FIG. 8 is a detailed functional block diagram of the manually operated telephone call metering device shown in FIG. 2.
Figure 8:
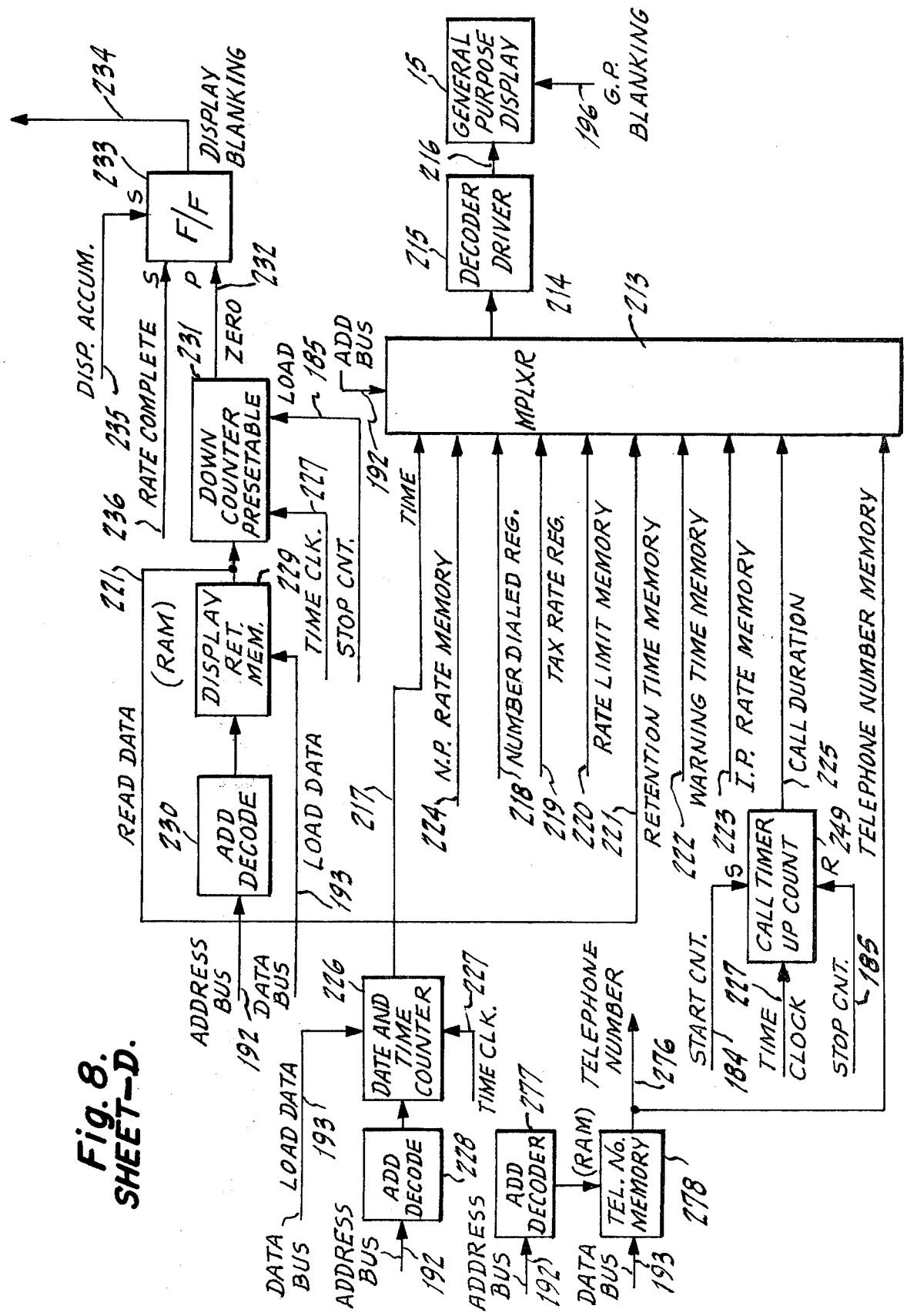
Figure 8:
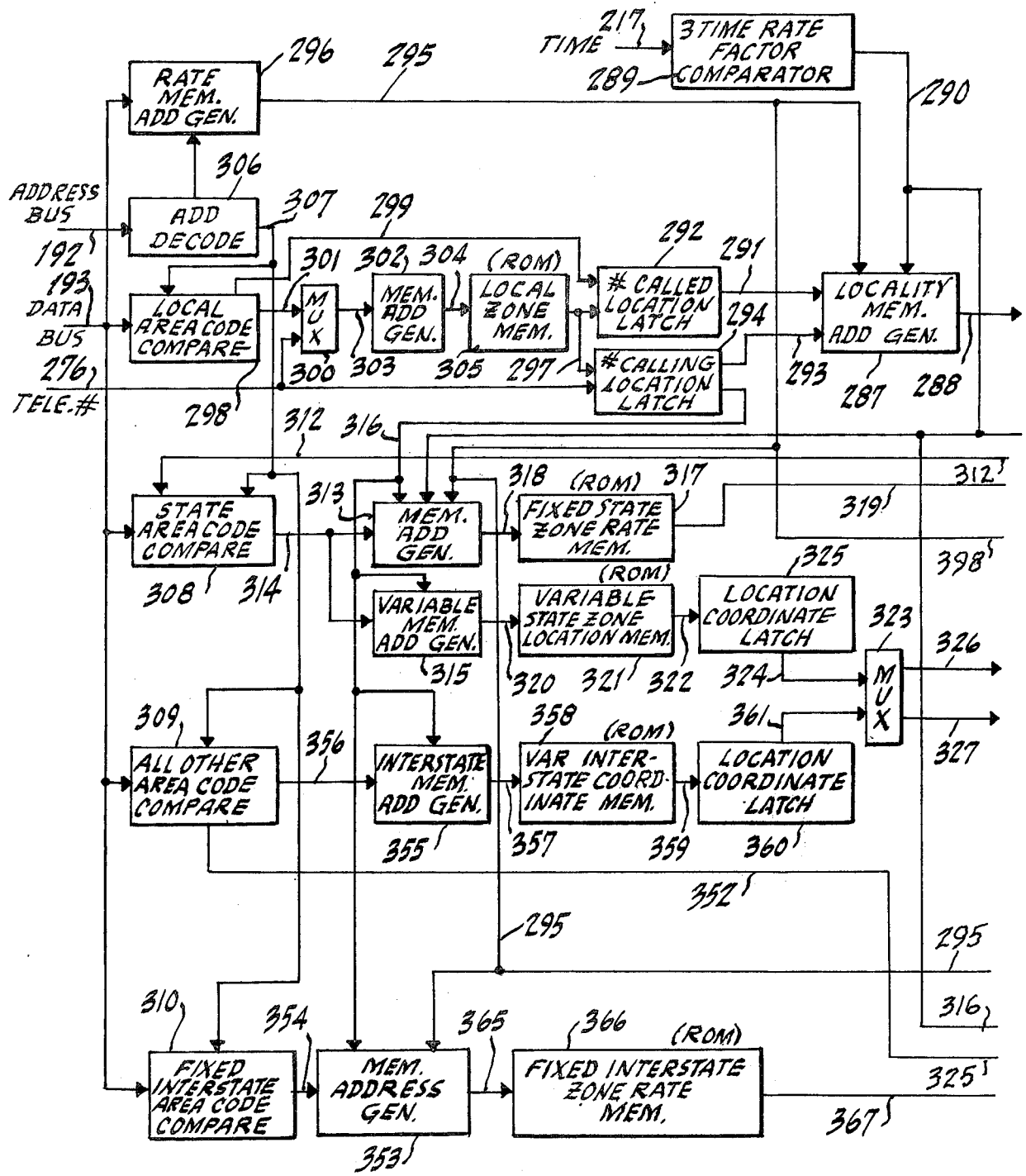
Figure 8:
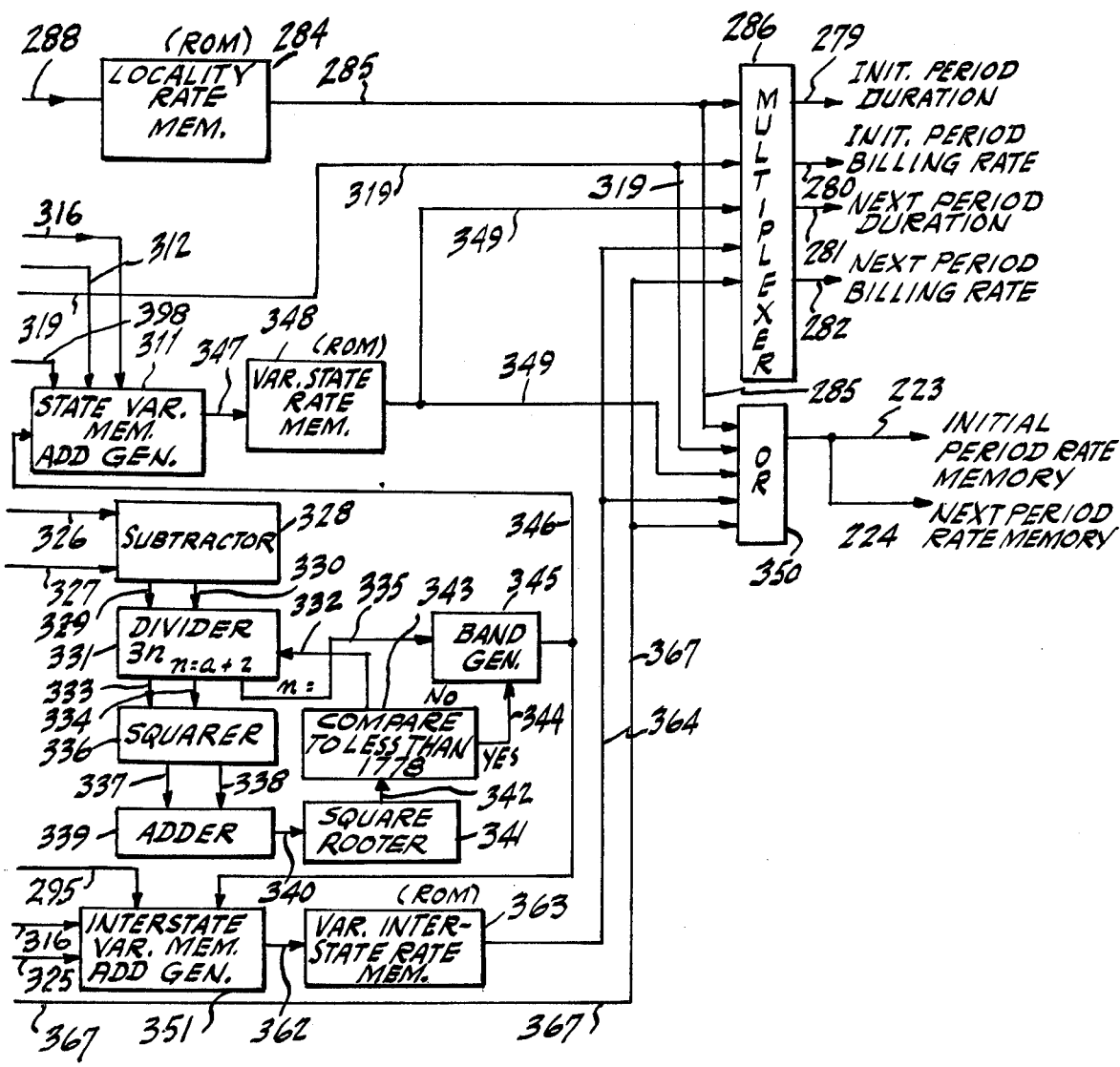

A more detailed block diagram of the cost determining device shown in FIG. 2 appears in FIG. 8. In order to minimize the amount of wiring required, multiplex techniques are employed to distribute digital data and address information. The digital data is transmitted to the various portions of the metering device shown in FIG. 8, via a data bus, and the address information is similarly transferred via an address bus.

In order to avoid cluttering the drawing and to facilitate an understanding of the operation of the device, wires are not drawn interconnecting all the data bus connections, nor are wires drawn interconnecting all the address bus connections or various other connections. Rather, all points which are interconnected are identified by the same designations. That is, all signals or lines labeled "data bus" refer to the same data bus, all signals or lines referring to "address bus" refer to the same address bus, all "start count" lines are interconnected with all other "start count" lines, etc.

When keys are depressed on the keyboard 22 to perform an operation as previously described (see FIG. 3 and Table I), the encoder 180 generates a corresponding serial digital code, which code is entered into the data register 181 and the address register 182. Signals from the encoder 180 corresponding to depression of the # and * keys are entered into the special control logic circuit 183, which generates corresponding start-count and stop-count signals on lines 184 and 185 respectively. Unless one of the special purpose keys A, B, C or D is depressed prior to depressing other keys, the digital signals generated by the encoder 180 are also transferred to the memory register 186 of the dialing circuit 187, so that the memory 186 contains a digital code corresponding to the telephone number to be called. When the # key is depressed on the keyboard 22, or the * is depressed (after depressing the # key), the dialing circuit 187 transfers a digital code corresponding to the contents of the memory 186 to the telephone interface dialing unit 188, which generates corresponding dialing signals (for a rotary dial telephone) or touch tone dialing signals (for a touch tone telephone system). These dialing signals are coupled to the telephone transmission network 189 and ultimately cause the calling telephone to be connected to the called telephone 190.

The address generator 191 receives the contents of the address register 182 and generates a corresponding address digital code on the address bus 192 only when the contents of the register 182 indicate that the special address key C was depressed prior to depressing other keys, i.e. that the information contained in the register 182 represents an address rather than data.

The digital code signals in the data register 181 are at all times coupled to the data bus 193.

The visual warning timer 194 causes flashing of the display readouts when (i) less than a preset amount of time remains to the end of a corresponding billing period (either the initial billing period or one of the next billing periods) or (ii) the cost of the call in progress exceeds a preset value. Simultaneously, an audible warning tone is generated by the tone circuit 195. The flashing of the readouts is caused by a periodic display blanking signal generated by the timer 194 on line 196.

The end of billing period warning signal is generated by a comparator 197 on line 198. The comparator 197 compares a signal from the down counter 199 on line 200 which represents the number of seconds remaining in the current billing period, with the preset warning time signal from the warning time random access memory 203 on line 204. When the time remaining to the end of the current billing period decreases to a value equal to that indicated by the signal on line 204, a warning signal is generated on line 198 and coupled to the timer 194 and the tone circuit 195 via the OR gate 205.

In order to preset the desired warning time into the random access memory 203, the address decoder 206 responds to the address code C8 (see Table I, item 11) to enable the memory 203 to load the corresponding data therein which is present on line 193 at that time.

In similar fashion, a signal indicating that the cost of the call has reached a preset limit is generated by the comparator 207 on line 208. The call cost warning signal on line 208 is also coupled to the timer 194 and tone circuit 195 via OR gate 205.

The comparator 207 generates the call cost warning signal by comparing a signal on line 209 corresponding to the current cost of the call in progress, with a rate limit memory signal on line 210 corresponding to a preset cost limit. The rate limit memory signal is generated by a rate limit random access memory 211, which receives a call cost limit signal from the data bus on line 193, and is enabled by the output of an address decoder 212 which responds to the C9 address code (see Table I, item 12).

In order to selectively display various items of data on the general purpose display 15, lines containing the various data signals are coupled to a multiplexer 213, which is responsive to the addressing of a selected data line via the address bus 192 to provide the corresponding data display signal on line 214. The decoder driver 215 places the data display signal on line 114 in the required format to provide a corresponding display signal on line 216 to the general purpose display readout 15.

The input signals to the multiplexer 213 are time of day and day of month, number dialed, applicable tax rate, preset cost or rate limit, display retention time, warning time to end of current billing period, initial period billing rate, next period billing rate, and call duration, on lines 217 to 225 respectively.

Each of the signals on lines 217 to 225 is coupled thereto from a corresponding register, counter or memory, as indicated by signal lines therefrom having corresponding reference numerals.

The time of day signal on line 217, which signal may also include data respecting the day of the month and day of the week, is derived from a date and time counter 226 which receives time clock signals on line 227 from a time clock which provides pulses at one second intervals. The counter 226 may be provided with desired initial or modified date and time settings by data from the data bus on line 193, with the counter 226 being enabled to load such data by an address decoder 228 responsive to C1 and C2 address codes (see Table I, items 1 and 2).

The display retention time signal on line 221 is provided by a display retention memory 229 which is loaded with data from the data bus 193 when enabled by the address decoder 230, which is responsive to a C10 address code (see Table I, item 14).

The display retention signal from the display retention memory 229 on line 221, presets a down counter 231 to a count capacity, in seconds, equal to the desired display retention time. The down counter 231 starts counting down from said preset time upon receipt of the stop-count signal on line 185, counting clock pulses from the time clock on line 227 until the count of zero is reached. At this time a signal is generated by the counter 231 on line 232 to set the flip-flop 233 to provide a logical zero blanking signal on line 234, to blank the display readouts 11 to 14. The flip-flop 233 is again set to permit operation of the readouts 11 to 14 in response to either (i) a display accumulator contents signal on line 235 or (ii) a rate complete signal on line 236.

The number dialed signal on line 218 to the multiplexer 213, is provided by the number dialed shift register 237, which obtains the digital signals corresponding to the number dialed from the data bus 193 when enabled by the address decoder 238, which is responsive to an address signal corresponding to depression of the # key or the * key (after depressing the # key).

The tax rate information to the multiplexer 213 on line 219 is provided by the tax rate register 239, which receives a total tax signal on line 240 from an adder 241 which receives as input signals, Federal, State, and local tax rate data from the corresponding random access memories 242, 243 and 244, on lines 245, 246 and 247 respectively. Alternatively, lines 245 to 247 may be individually coupled to the multiplexer 213, to permit display, if desired, of the separate Federal, State and local tax rates. The tax rate information in each of the random access memories 242 to 244 may be initially entered therein, or subsequently modified, by data on the data bus 193, in response to selective enable signals from the address decoder 248, which is responsive to corresponding tax rate address codes C3, C4 and C5 (see Table I, item 4).

The call duration signal to the multiplexer 213 on line 225 is provided by a call timer 249, which starts counting one second timing pulses from the time clock on line 227, upon receipt of the start-count signal on line 184, and stops counting said timing pulses upon receipt of the stop-count signal on line 185.

The respective displays 11 to 14 are fed by corresponding decoder drivers 250 to 253. The decoder driver 252 receives a coded signal corresponding to the next period cost, on line 224, from a next period cost latch 254. The decoder driver 253 receives a next period duration coded signal on line 255 from the next period latch circuit 256. This next period duration signal is also coupled to a multiplexer 257, which also receives a first or initial period duration coded signal on line 258 from a first period latch circuit 259. The multiplexer 257 is responsive to the down-count signal on line 200 to (i) initially provide the first or initial period duration signal on line 258 to the output line 260 thereof during the initial billing period of the call in progress, and (ii) thereafter provide the next period duration signal on line 255 to output line 260 thereof for each next period duration. These signals on line 260 are coupled to an adder accumulator 261 which provides an accumulated output signal on line 262 to the decoder driver 250, corresponding to the billed time for the call in progress. The decoder driver 250 couples the time billed signal on line 262 to the time billed display readout 12, to indicate the billed time.

To make the difference between the billed time signal on line 262 and the call duration signal on line 225 more clear, it should be understood that the call duration signal on line 225 indicates, to the nearest second, the time that the call has been in progress. The time billed signal on line 262, however, is of a discrete nature, and increases in incremental steps corresponding to the end of each applicable billing period.

Assume for example, that a particular call has a three minute initial billing period and one minute next billing period. As soon as the call is initiated, i.e. the calling and called telephones are interconnected, the display 12 will read a time billed of three minutes, while the call duration signal 225 will begin at zero and increase, second by second, while the call is in progress. When the call has been in progress for three minutes and one second, the call duration signal on line 225 will indicate a time of three minutes and one second. However, the time billed display 12 will increment to the next billing increment of time, i.e. 4 minutes. Thus the call duration signal on line 225 indicates the total amount of time that the call has been in progress, while the time billed display 12 indicates the time for which the calling party is being charged, regardless of whether the actual duration of the call corresponds to said time.

The adder-accumulator 261 is reset at the end of a call by the stop-count signal on line 185.

The billing period signal on line 260 is also coupled to set the counting capacity of the down-counter 199 which counts the one second time clock pulses on line 227 over a time period initiated by the start-count signal on line 184 and terminated by the stop-count signal on line 185. At the end of each billing period, the down-counter 199 reaches a zero count, i.e. the capacity corresponding to the duration of said time period as set by the signal on line 260, and provides a carry-add signal to the adder-accumulator 263 on line 264, causing the corresponding billing period cost from the multiplexer 265 on line 266 to be added to the contents of the accumulator 263.

The multiplexer 265 couples to the output line 266 thereof (i) the first period cost signal from the first or initial period cost latch 267 on line 223, and thereafter (ii) the next period cost signal on line 224 from the next period cost latch 254, to set output terminal 266 thereof. Thus the signal on line 266 at all times indicates the cost of the corresponding billing time period. At the end of each billing time period, the carry-add signal on line 264 causes the corresponding cost encoded signal on line 266 to be added to the contents of the accumulator 263, so that the output signal of the accumulator 263 on line 268 corresponds to the amount billed for the call in progress. The amount billed signal on line 268 is selectively coupled to the amount billed display 11 via a multiplexer 269 and the decoder driver 251.

The amount billed signal on line 268 is also selectively coupled to a date-to-month adder-accumulator 270 via a multiplexer 271, to add the cost of the call in progress to the total costs of calls previously made from the calling telephone from the beginning of the corresponding month to the current date. Thus the output of the accumulator 270 on line 272 indicates the total amount billed for the corresponding month to date. The multiplexer 269 is controlled by an address decoder 273 coupled to the address bus 192 and responsive to depression of the special key A 9see Table I, item 9) to display the month-to-date amount billed, as provided on line 272, on the amount billed display readout 11, with the light 17 (see FIG. 3) being simultaneously illuminated. Whenever the special key A is not depressed, the amount billed signal on line 268 for the call in progress is displayed on the readout 11.

The date-to-month adder-accumulator ceases to accumulate further any amounts corresponding to the call in progress, when the stop-count signal is received on line 185.

At the end of each month, it is necessary to reset the adder accumulator 270. Also, it may be desirable from time to time to set the contents of the adder-accumulator 270 to a preset value. This setting or resetting of the accumulator 270 is accomplished via the multiplexer 271, which is enabled by a signal from the address decoder 274 to enter therein initial data (which could if desired be zero, corresponding to a resetting of the accumulator 270) present on the data bus 193 as a result of depression of corresponding keys of the keyboard 22, via the accumulator load gates 275, with the address decoder 274 being responsive to a C7 code followed by the address of the accumulator 270 (see Table I, item 8).

The manner in which the initial and next period duration and cost signals are provided to the latches 259, 267, 256 and 254, on lines 279 to 282 respectively, will be more clearly understood by reference to FIG. 8, sheet C, which shows the circuitry for providing said signals as well as the initial period rate memory and next period rate memory signals to the multiplexer 213 on lines 223 and 224, respectively.

The memory circuitry shown in FIG. 8 (sheets E-F computes the initial and next period duration and cost signals separately for (i) local calls within defined local rate zones, (ii) non-local interstate calls having distance-dependent rates, and (iii) non-local interstate calls having fixed rates for calls between predetermined rate centers. The duration and cost signals for local calls are generated by a locality rate memory 284 on line 285, and are coupled to a multiplexer 286. The memory 284 is addressed by a locality memory address generator 287, which generates a memory address signal on line 288, in response to (i) a time of day/day of week/holiday composite signal from the three time rate factor comparator 289 on line 290, (ii) a signal on line 291 corresponding to the telephone number being called, from the number called location latch 292, (iii) a signal on line 293 corresponding to the number of the telephone from which the call is being made, from the number calling location latch 294, and (iv) the memory address signal on line 295 from the rate memory address generator 296, which is responsive to a memory address code C6 followed by the address of the particular desired memory location (see Table I, item 5). The address signal on line 295 is merely an alternative way of addressing the memory 284, for purposes of displaying the contents of a particular cell thereof on the general purpose display readout 15 (see FIG. 3). The memory 284 is a read only memory, so that its contents cannot be changed, except by special techniques or by substituting another memory therefor.

The number calling location latch circuit 294 receives a digital signal on line 276 corresponding to the number of the calling telephone and a coded signal on line 297 indicating whether the calling telephone is in the same local zone as the number of the telephone being called. If so, the digital signal on line 276 corresponding to the number of the calling telephone is routed to line 293 to provide a corresponding input signal for the address generator 287 to generate an address signal on line 288 to the locality rate memory 284.

The calling telephone number coded signal on line 276 is provided by a calling telephone number memory 278, which is coupled to the data bus 193, with the memory 278 being enabled by the address decoder 277 to store the data present on the data bus when the signal present on the address bus 192 corresponds to depression of keys of the keyboard 22 generating a C11 code (see Table I, item 19).

The telephone number to be called is initially entered into the keyboard 22 as previously described, and appears on the data bus 193. The called number is routed to the number called location latch 292 through a local area code compare circuit 298, which circuit (i) generates an enable signal to the number called location latch 292 on line 299 when the number being called is a local number and (ii) couples the digital signal corresponding to the number being called to a multiplexer 300 on line 301. The other input to the multiplexer 300 is a digital signal on line 276 corresponding to the number of the calling telephone. The multiplexer 300 is actually a data-routing circuit which permits the digital signals on lines 276 and 301 to be coupled to the memory address generator 302, through line 303, whichever signal is present being so coupled through the multiplexer 300. Due to the manner of operation of the metering device, as previously described, the digital signals on lines 193 and 276 are present at different times.

The memory address generator 302 generates an address signal on line 304 to address the local zone memory 305 to cause said memory to provide on output line 297 thereof, digital signals corresponding to (i) the number of the local zone in which the calling telephone is situated and (ii) the number of the local zone in which the called telephone is situated. The calling number latch 294 then couples the corresponding local zone designation signal to line 293 to the local memory address generator 287, while the number called location latch 292 couples the corresponding local zone designation signal to line 291, to the address generator 287. Thus the address generator 287 is provided with input signals, inter alia, indicating the local zones in which the calling and called telephones are situated. By utilizing said local zone information as well as the time of day etc., information provided on line 290, the local memory address generator 287 generates an appropriate address signal to cause the rate memory 284 to output the corresponding call rates on line 285.

When a telephone number to be called has been entered via the keyboard 22, into both the data register 181 and the address register 182, the address generator 191 generates a signal on the address bus 192 indicating that the information presently on the data bus corresponds to a telephone number to be called. This information, in digital form on the address bus 192, is coupled to the address decoder 306, which generates a comparator enable signal on line 307, to enable operation of the local area code comparator 298, the state area code comparator 308, the fixed interstate area code comparator 310, and the other interstate area code comparator 309. The state area code comparator 308 compares the number of the called telephone on line 193 with an area code table internally stored therein to (i) generate an enable signal to the state variable memory address generator 311 on line 312 and (ii) couple the code representing the called telephone number to the memory address generator 313 and the variable address generator 315 on line 314. The memory address generator 313 is also responsive to the calling telephone number from the latch 294 on line 316, the time of day information, etc., from the three time rate factor comparator 289 on line 290, and (at another time) to an address signal from the address generator 296 on line 295 (when it is desired to address a particular memory cell location within the generator 313), to generate a corresponding address code which is coupled to the fixed state zone rate memory 317 on line 318. The fixed state zone rate memory 317 then generates the corresponding initial and next period duration and rate information on line 319, which is coupled to the multiplexer 286.

The variable memory address generator 315 is responsive to the called telephone number signal on line 314 and the calling telephone number signal on line 316, which signals are present at different times, to generate corresponding addresses on line 320 for each of said telephone number signals. These corresponding addresses are coupled to a variable state zone location read-only memory 321, to cause said memory to generate corresponding location coordinate signals on line 322, said signals identifying the X, Y, rectangular grid "coordinates" (which do not necessarily correspond to geographic or latitude/longitude values) of the nearest "rate center" for the calling and called telephones respectively. These X, Y coordinate signals are coupled to a multiplexer 323 on line 324 via a location coordinate latch circuit 325. Thus, the signals on line 324 represent (i) at one time the X, Y, coordinates of the rate center nearest to the calling telephone and (ii) at another time the X, Y coordinates of the rate center nearest the called telephone.

The coordinate signals on line 324 are coupled through the multiplexer 323 and appear simultaneously on multiplexer output lines 326 and 327 respectively. That is, line 326 transmits digital signals corresponding to the coordinate location of the calling telephone, while line 327 transmits digital signals corresponding to the coordinate location of the called telephone. For example, if desired, the digital signals on each line could be in the form of a digital code word having a first portion corresponding to the X coordinate and a second portion corresponding to the Y coordinate.

The X, Y coordinate signals for the calling and called telephones on lines 326 and 327 respectively are coupled to a subtractor circuit 328, which compares the respective X and Y coordinates of the calling and called telephone numbers to provide an X difference signal on line 329 and a Y difference signal on line 330. The X and Y difference signals on lines 329 and 330 respectively are coupled to a divider circuit 331 which divides each of said difference signals by a number equal to $3^n$, where $n$ is initially zero, and is increased by one each time an increment pulse is received by the divider 331 on line 332. Thus the output signal generated by the divider circuit 331 on line 333 is a digital code signal corresponding to a value equal to the X difference signal divided by $3^n$, where $n$ is an integer, and similarly the output signal of the divider 331 on line 334 is a digital code signal having a value corresponding to the Y difference signal divided by $3^n$, where $n$ is the same integer.

Divider 331 also generates a signal on line 335 which corresponds to the value of the particular integer $n$ utilized in the divider computation.

The divided difference signals on lines 333 and 334 are coupled to a squarer circuit 336, which provides corresponding outputs on lines 337 and 338 in the form of digital code signals having values equal to the squares of the corresponding input signals on lines 333 and 334 respectively. These squared signals on lines 337 and 338 are added in an adder 339, which produces a sum signal corresponding to the sum of the squares of the signals appears on lines 333 and 334, said sum signal being coupled to a square root circuit 341 on line 340.

The output signal of the square root circuit 341, on line 342, is a digital code signal having a value corresponding to the square root of the sum of the squares of the signals appearing on lines 333 and 334. This resultant signal on line 342 is coupled to a comparator circuit 343, which generates a gating signal on line 344 when the signal on line 342 corresponds to a value less than 1,778 (a value determined by the distance rate billing scheme employed in the United States), and simultaneously generates the inverse of said gating signal on line 332. This gating signal on line 344 is coupled to a rate band generator 345, which couples the signal on line 335 through to output line 346 thereof, so that the signal on line 346 corresponds to the value of the integer $n$ utilized in the divider computation within the circuitry 31.

If the value of the signal on line 342 is greater than 1,778, an increment signal is generated on line 332 to cause the divider 331 to utilize the next higher value of the integer $n$ in the aforementioned dividing computation. As a result, the corresponding signal on line 342 is altered, and this alteration of said signal continues until the comparator 343 generates a gating signal on line 344 when the value of the signal on line 342 becomes less than 1,778.

The rate band designation signal on line 346, i.e. having a value corresponding to that of the integer $n$, is coupled to the state variable memory address generator 311, which, utilizing said signal as well as the other input signals thereto, generates a rate address signal on line 347 to the variable state rate read-only memory 348, which memory in turn generates the corresponding initial and next period duration billing rate signals on line 349, which signals in turn are coupled to the multiplexer 286 as well as the OR gate 350.

Telephone calls to called telephones in other states may be divided into two catagories, for U.S. billing purposes, i.e. (i) those telephones which are situated in zones having area codes such that the cost of calls from any calling telephone within the area code in which it is situated to any called telephone associated with certain predetermined rate centers is "fixed", and (ii) all other interstate telephone calls. The comparator 309 generates an enable signal to the interstate variable memory address generator 351 on line 352 for calls in catagory (ii) above, while the fixed interstate area code comparator 310 couples the signal on line 276 to the memory address generator 353 on line 354 for calls in catagory (i) above. For calls in catagory (ii) above, the other area code comparator 309 also couples the signals on line 276 to the interstate memory address generator 355 on line 356.

Interstate memory address generator 355 is then responsive to the signal on line 356 corresponding to the called telephone number and the signal on line 316 corresponding to the calling telephone number, to generate corresponding address signals (at two different times, since the signals on lines 316 and 356 are not present at the same time) on line 357 to the variable interstate coordinate memory 358. The memory 358 then generates corresponding X, Y coordinate signals on line 359, which signals are temporarily stored in the location coordinate latch 360. The multiplexer 323 is coupled to receive the location coordinate signals from the latch 360 on line 361, and to couple said signals to lines 326 and 327, or alternatively couple the signals on line 324 to lines 326 and 327. Since the signals on lines 324 and 361 are present at different times, the multiplexer 323 effectively acts as an "OR" gate for data signals to couple either of the data signals on lines 324 and 361 to the output lines 326 and 327. As previously described, the multiplexer 323 also "breaks up" X, Y coordinate signals on lines 324 and 361 to provide X, Y coordinate signals on line 326 corresponding to the calling telephone number, and X, Y coordinate signals on line 327 corresponding to the called telephone number. The processing circuits 328, 331, 336, 339, 341 and 343 operate in the same manner for the coordinate signals from line 361 as previously described for the coordinate signals from line 324, to provide a corresponding value of the integer $n$ on line 335 to the rate band generator 345, which couples the rate band designation signal $n$ on line 346 to the interstate variable memory address generator 351. The address generator 351 is responsive to the rate band designation signal on line 346 and to the other signals applied thereto on lines 290, 352 and (at another time) 295, to generate a corresponding interstate variable rate address signal to the variable interstate rate read-only memory 363 on line 362. The variable interstate rate memory 363 then generates a corresponding output rate signal representing initial and next period durations and billing rates, on line 364 to the multiplexer 286 and OR gate 350.

When the fixed interstate area code comparator 310 determines that the number of the called telephone is in catagory (i) above, it couples the called number signal on line 276 through to the memory address generator 353 on line 354. The memory address generator 353 is responsive to the signals on lines 316 and 354 corresponding to the calling and called telephone numbers, and to (at another time) the signal on line 295, to generate a fixed interstate zone address signal on line 365 to the fixed interstate zone rate read-only memory 366. The fixed interstate rate memory 366 then generates corresponding initial and next period duration and billing rate signals on line 367 to the multiplexer 286 and OR gate 350.

While the various digital signals utilized in the device shown in FIG. 8 may be of any desired digital format, i.e. serial, parallel, binary, binary coded decimal, etc., it is preferred that the billing rate schedule data comprise a single digital "word" for each desired or initiated telephone call, said word comprising ten decimal digits or the equivalent thereof, i.e. four decimal digits for the initial period rate, four decimal digits for the next period rate, one decimal digit for the initial period duration, and one decimal digit for the next period duration.

The manner in which the call duration processor 73 (see FIG. 4) operates to produce the start-count signal on line 81 and the stop-count signal on line 82, will be more fully understood by reference to FIG. 9, which shows a signal processing circuit for deriving start-count and stop-count signals from the telephone transmission lines 44 and 45. The processor shown in FIG. 9 may also be employed in conjunction with the device shown in FIG. 8, to generate the start-count and stop-count signals on lines 184 and 185 automatically, rather than utilizing the special control logic circuit 183 to generate same. As previously described in conjunction with the explanation of the operation of the signal processor 42 and memory and control circuitry 41 of FIG. 1, various of the signals listed in Table II, supra, are derived from the transmission lines 44 and 45 by techniques well known in the telephone art. For example, the off-hook detector circuit 368 processes the signals on the telephone transmission lines to provide a signal on line 369 indicating the presence of an off-hook condition and an inverted signal on line 370 indicating the absence of said condition. The dial tone detector circuit 371 provides an output signal on line 372 indicating the presence of a dial tone. The ring detector circuit 373 provides an output signal on line 374 indicating that the called telephone is being rung. The signal on line 374 thus is present while ringing is in progress, and disappears in the intervals between rings. The busy detector circuit 375 generates an output signal on line 376 indicating the presence of a busy signal on the transmission lines 44 and 45. The calling party control detection circuit 377 provides an output signal on line 378 indicating the presence of a C.P.C. (calling party control)

signal on the transmission lines 44 and 45. The audio amplifier 379 provides an amplified audio frequency signal on line 380 to the voice or tone detection circuit 381 and to the audio click detector 382. The voice or tone detector circuit 381 provides an output signal on line 383 indicating the absence of voice transmission. The audio click detector 382 provides an output signal on line 384 indicating that a click has been sensed at the termination of a corresponding telephone call connection.

The C.P.C. signal on line 378 is coupled to a line current drop detector 385 and to a line reversal detector 386. The line current drop detector 385 provides an output signal on line 387 indicating that a drop in line current has occurred at the termination of a corresponding telephone call connection. The line reversal detection circuit 386 provides (i) an output signal on line 389 indicating that a telephone call connection has been made, and (ii) an output signal on line 388 indicating that a corresponding telephone call connection has been terminated.

The end of ringing detection circuit 390 is responsive to the ring signal on line 374 to detect the end of ringing. That is, for example, there is a five second standard time interval between rings, the circuit 390 will generate an end of ringing signal on line 391 if (i) at least one ring signal has appeared on line 374 and (ii) more than 5 seconds has elapsed after the appearance of said signal.

The OR gate 392 has input terminals coupled to the signals on lines 391 and 389 to provide an output signal on line 393 when (i) the end of ringing signal is present or (ii) the line reversal signal indicates that a telephone call connection has been made. The output of the OR gate 392 on line 393 is coupled as an input to an AND gate 394, said AND gate having as another input a not-busy signal derived by inversion of the busy signal on line 376. Thus, the AND gate 394 provides a start-count output signal when (i) the end of ringing is detected or a line reversal signal indicating establishment of the telephone call connection has occurred, and (ii) the telephone transmission line is not busy.

The signals on lines 370, 387, 388, 372, 383 and 384 are coupled as inputs to an OR gate 395, the output of which provides the stop-count signal when any of the conditions previously described on the input lines thereto are present.

Rather than initiating dialing by pressing the # key as previously described, dialing may automatically be initiated by an allow dial signal on line 397, said signal being provided as an output of the AND gate 396, the inputs to which AND gate are the signals on lines 369 and 372. Thus, dialing is automatically initiated when the telephone is off the hook and a dial tone is present. It should be understood that while a preferred embodiment of the billing rate schedule determination circuitry is shown in FIG. 8, other memory access techniques may be employed, depending upon the type of memory units utilized and the structure of the telephone billing rate schedules, i.e. whether associated with zones, interstate and intrastate rates, distances, etc. Therefore the details of the construction of memory circuits will vary from one telephone system to another, and from one country to another.

We claim:

1. A telephone call cost determining device for determining the cost of a telephone call from a first telephone of a calling party having a corresponding first telephone number and a first area code associated therewith, to a selected one of a multiplicity of second telephones each having a corresponding second telephone number which may include an area code, said cost being dependent upon a predetermined billing rate schedule and the duration of the call, said device being situate at and operatively associated with said first telephone, comprising:

a first memory for storing a first coded signal corresponding to said first telephone number;

telephone rate memory means for storing coded rate signals corresponding to a billing rate schedule for telephone calls initiated from a calling telephone having a number within said first area code, said stored rate signals comprising rate information for telephone calls to each of said multiplicity of second telephones from any telephone having a number within said first area code;

said memory means having means for determining rate information for local calls within defined local rate zones, (ii) non-local calls having distance-dependent rates, and (iii) non-local calls having fixed rates for calls between predetermined rate centers;

a keyboard for generating a second coded signal corresponding to said second telephone number of said selected telephone;

addressing means responsive to said first and second coded signals for addressing said telephone rate memory means to select a third coded signal corresponding to rate information stored therein respecting the cost of said call;

telephone call timing means responsive to a call connection signal and a call termination signal for providing a coded call duration signal corresponding to the time interval between said connection and termination signals;

cost determination means responsive to said third coded signal and said coded call duration signal for generating a fourth coded signal corresponding to the cost of said call between said first and second telephone; and means responsive to said fourth coded signal for displaying the cost of said call to the calling party.

2. The device according to claim 1, further comprising accumulating means coupled to said cost determination means for storing a fifth coded signal corresponding to the total cost of telephone calls made from said first telephone during a given time period.

3. A device according to claim 1, further comprising a non-volatile storage medium, and means for recording on said medium signals encoding cost information corresponding to successive ones of said four coded signals respecting calls to selected ones of said various telephone numbers.

4. The device according to claim 3, further comprising means for storing on said medium predetermined identification code signals corresponding to said recorded information.

5. The device according to claim 1, further comprising means coupled to said first memory for initiating a telephone connection between said first and second telephones.

6. The device according to claim 1, further comprising means for detecting the establishment of a connection between said first and second telephones and for thereupon generating said call connection signal.

7. The device according to claim 1, further comprising means for detecting the termination of a connection between said first and second telephones and for thereupon generating said call termination signal.

8. The device according to claim 1, further comprising means for generating a warning signal when the cost of said call exceeds a predetermined limit.

9. The device according to claim 1, wherein said rate information comprises an initial rate for a specified initial billing time period, and another rate for each predetermined additional billing time period.

10. The device according to claim 9, further comprising means for generating a warning signal a desired time prior to the end of each corresponding one of said billing periods.

11. The device according to claim 1, wherein said coded rate signals include signals corresponding to rates of tax on the corresponding telephone calls.

12. A telephone for use by a calling party, including a call cost determining device for determining the cost of telephone calls made therefrom, said telephone having a corresponding first telephone number and a first area code associated therewith, said calls being made to selected ones of a multiplicity of second telephones each having a corresponding second telephone number, said cost being dependent upon a predetermined billing rate schedule comprising an initial billing rate for a specified initial billing time period and another billing rate for each predetermined additional billing time period, said device comprising:

a first memory for storing a first coded signal corresponding to said first telephone number;

telephone rate memory means for storing coded rate signals corresponding to said billing rate schedule, said stored rate signals comprising rate information for telephone calls to each of said multiplicity of second telephones from any telephone within said first area code;

a keyboard for generating second coded signals corresponding to each of said second telephone numbers of said selected telephones;

addressing means responsive to said first and second coded signals for addressing said telephone rate memory to select third coded signals corresponding to rate information stored therein respecting the cost of each of said calls;

telephone call timing means coupled to telephone signal transmission lines of said telephone and responsive to call connection and call termination signals derived from said lines, for providing coded call duration signals on a real time basis corresponding to the time interval between said connection and termination signals;

cost determination means responsive to said third coded signals and to said call duration signals for generating fourth coded signals corresponding to the cost of each of said calls between said first telephone and said selected second telephones;

accumulating means coupled to said cost determination means for storing fifth coded signals corresponding to the total cost of all calls made from said first telephone to said selected second telephones during a given time period; and means for displaying to the calling party cost information corresponding to said fourth and fifth coded signals, the cost information corresponding to said fourth coded signals being displayed while the corresponding call is in progress.

13. The device according to claim 12, further comprising a non-volatile storage medium, and means for recording on said medium cost information corresponding to said fourth coded signals.

14. The device according to claim 13, further comprising means for storing on said medium predetermined identification indicia corresponding to selected ones of said recorded fourth coded signals.

15. The device according to claim 12, further comprising a second memory for storing said second coded signals and means coupled to said second memory for initiating a telephone connection between said first-mentioned and selected second telephones.

16. The device according to claim 17, further comprising means for displaying said second coded signals prior to operation of said telephone connection initiating means.

17. The device according to claim 12, further comprising call connection detecting means for generating said call connection signal upon the establishment of a connection between said first-mentioned and second telephones, and call termination detecting means for generating said call termination signal upon the termination of said connection.

18. The device according to claim 12, further comprising means for generating a warning signal when the cost of said call exceeds a predetermined limit.

19. The device according to claim 12, further comprising means for generating a warning signal a desired time prior to the end of each corresponding one of said billing periods.

20. The device according to claim 12, further comprising means responsive to said second and third coded signals for displaying said selected telephone numbers and said corresponding rate information respectively.

21. A telephone including a call cost determining device for determining and displaying, on a real time basis, the cost of a telephone call made therefrom, said telephone having a corresponding first telephone number, and a first area code associated therewith, said call being made to a selected one of a multiplicity of second telephones each having a corresponding second telephone number, said cost being determinable in accordance with (i) an initial billing rate corresponding to said second telephone number for a specified initial time period, and (ii) a next period billing rate corresponding to said second telephone number for each predetermined additional billing time period, said device comprising:

a first memory for storing therein a first coded signal corresponding to said first telephone number;

telephone rate memory means for storing coded rate signals corresponding to said initial and other billing rates, and said initial and additional billing time periods, for telephone calls to said second telephones from any telephone within said first area code;

a keyboard for generating second coded signals corresponding to each of said selected second telephone numbers;

first addressing means responsive to said first and second coded signals for addressing said telephone rate memory to select third coded signals corresponding to the initial and additional billing time periods and the initial and other billing rates for a call between said first-mentioned telephone and said selected second telephone; and means responsive to said third coded signals for indicating the corresponding values of said initial and additional billing time periods and said initial and other billing rates, while said call is in progress.

22. A telephone call routing device for minimizing the cost of a telephone call from a first telephone to a second telephone having a corresponding telephone number via one of a number of available telephone transmission circuits therebetween, each circuit having a switching point addressable by a corresponding tie line, each said switching point having a remote telephone number associated therewith, the cost of said call being related to the particular cost of a call from a telephone having said remote number to said second telephone, said device comprising:

first memory means for storing a number of first coded signals corresponding to each of said remote telephone numbers;

telephone rate memory means for storing therein coded rate signals corresponding to a billing rate schedule defining corresponding particular costs for calls between each of said switching points having said remote telephone numbers and any of a multiplicity of other telephones including said second telephone and having corresponding other telephone numbers;

said rate memory means having means for determining rate information for (i) local calls within defined local rate zones, (ii) non-local calls having distance-dependent rates, and (iii) non-local calls having fixed rates for calls between predetermined rate centers;

addressing means responsive to each of said first coded signals and to second coded signals corresponding to said telephone number for sequentially addressing said telephone rate memory means to generate the coded rate signals defining each said particular cost of a call from a telephone having one of said remote numbers to said second telephone;

comparison means responsive to said generated coded rate signals for identifying a selected one of said tie lines corresponding to the lowest value of said particular costs; and switching means coupled to said comparison means for addressing a selected one of said switching points via said selected one of said tie lines.

23. In a coin operated telephone having a corresponding first telephone number for placing telephone calls to any of a multiplicity of second telephones each having a corresponding second telephone number, said telephone having dialing means, self-contained payment monitoring means and self-contained call dialing control means for initiating one of said telephone calls in response to a current cost status signal, telephone rate memory means for storing coded rate signals indicative of a billing rate schedule for telephone calls initiated from said coin operated telephone to each of said second telephones;

said memory means having means for determining rate information for (i) local calls within defined local rate zones, (ii) non-local calls having distance-dependent rates, and (iii) non-local calls having fixed rates for calls between predetermined rate centers;

addressing means coupled to said dialing means and responsive to the dialing of a selected one of said second numbers for addressing said memory means to generate selected coded rate signals corresponding to the particular billing rate schedule for a call from said first telephone to said second telephone;

means for determining the duration of said call and for utilizing said particular billing rate schedule and said duration to generate a time cost signal corresponding to the current cost of said call; and metering means responsive to said time cost signal for providing said current cost status signal only when said payment monitoring means indicates receipt of payment in an amount at least equal to the current cost of said call, whereby a telephone call can be completed from said coin operated telephone without any rate or payment signalling between said coin operated telephone and the associated central office.

24. In a coin operated telephone according to claim 23, telephone call timing means for providing a timing signal indicative of the duration of said call from said first telephone to said second telephone;

current cost determination means responsive to said selected coded rate signals and coupled to said timing means for providing a current call cost signal indicative of the cost of said call from said first telephone to said second telephone on a current basis;

means for comparing said current call cost signal with the total payment made to said coin operated telephone as indicated by said payment monitoring means; and means for providing a warning signal when the difference between said total cost payment and said current cost signal reaches a predetermined value.

25. In a coin operated telephone according to claim 24, means rendering said metering means responsive to said current cost signal for providing said current cost status signal only when said payment monitoring means indicates receipt of total payment in an amount at least equal to the value defined by said current cost signal.

26. A telephone including a call cost determining device for determining and indicating to the calling party the cost of a telephone call from the telephone used by the calling party, said telephone having a telephone number and an area code associated therewith, to any called party having a telephone number different from that of the calling party, said cost being dependent upon a predetermined billing rate schedule and the duration of the call, said device comprising:

first memory means for storing a first coded signal corresponding to the telephone number of the calling party;

rate memory means for storing coded data corresponding to said billing rate schedule for calls from any telephone having a number within said area code to the telephone of any called party;

said rate memory means having means for determining rate information for (i) local calls within defined local rate zones, (ii) non-local calls having distance-dependent rates, and (iii) non-local calls having fixed rates for calls between predetermined rate centers;

means for generating a second coded signal corresponding to the telephone number of a selected called party;

control means responsive to said first and second coded signals to address the rate memory means to select the applicable rate and generate output signals which indicate the cost of the call between the calling and called parties for preset time intervals, said control means being selectively operable (i) prior to the establishment of a connection between the calling and called telephones, and (ii) while said call is in progress;

timing means for measuring the duration of the call between the calling and called parties;

cost determining means responsive to the timing means and the rate memory output signals and operative while the call is in progress to generate a total cost signal for said call; and indicating means connected to receive said total cost signal and indicate the total cost of said call to the calling party.

27. The device according to claim 26, wherein said telephone used by the calling party is coin operated.

28. The device according to claim 27, wherein said telephone used by the calling party includes:

payment receiving means;

payment monitoring means coupled to said payment receiving means for determining the amount paid thereto by the calling party;

dialing means coupled to said means for generating said second coded signal;

call dialing control means for initiating and maintaining a telephone call between the calling party and the called party in response to a current cost status signal; and comparison means responsive to said payment monitoring means and said total cost signal for generating said current cost status signal only when said amount paid is at least equal to said total cost.

29. The device according to claim 26, further comprising accumulating means for determining and storing a composite cost signal corresponding to the sum of successive ones of said total cost signals for calls from the telephone used by the calling party; and means for displaying said composite cost signal.

30. The device according to claim 26, wherein said second coded signal generating means comprises the telephone used by the calling party, and transducer means responsive to the dialing of the telephone number of said selected called party via said calling telephone.

31. The device according to claim 26, further comprising means for recording on a non-volatile storage medium coded cost signals corresponding to successive ones of said total cost signals for calls made from said telephone used by the calling party.

32. The device according to claim 31, further comprising means for storing on said medium predetermined identification code signals corresponding to respective ones of said recorded coded cost signals.

33. The device according to claim 26, wherein said timing means is responsive to a start-count signal for commencing measurement of the duration of said call between the calling and called parties, and to a stop-count signal for terminating measurement of the duration of said call.

34. The device according to claim 33, further comprising signal processing means coupled to the telephone used by the calling party, for generating at least one of said start-count and stop-count signals.

35. The device according to claim 26, further comprising means for generating a warning signal when the cost of said call exceeds a predetermined limit.

36. The device according to claim 26, wherein the coded data stored in said rate memory means corresponds to an initial rate for a specified initial billing time period, and another rate for each predetermined incremental billing time period thereafter.

37. The device according to claim 36, further comprising clock means for generating a time signal corresponding to the time of day that said call is made, said cost determining means being responsive to said time signal, said timing means, and the rate memory output signals to generate said total cost signal.

38. The device according to claim 36, further comprising calendar means for generating a calendar signal indicating the particular day of the week when said call is made, said cost determining means being responsive to said calendar signal, timing means, and the rate memory output signals to generate said total cost signal.

39. The device according to claim 36, further comprising means for generating a warning signal a desired time prior to the end of each corresponding one of said billing periods.

40. The device according to claim 26, wherein said coded data stored in said rate memory means includes signals corresponding to rates of tax on corresponding telephone calls.

41. A telephone call cost determining device for determining and indicating to the calling party the cost of a telephone call from a first telephone having a number within a given area code used by the calling party and having a first telephone number corresponding thereto, to a second telephone of a called party having a corresponding second telephone number, said cost having an initial value for a predetermined initial time period and an incremental value for each predetermined incremental time period thereafter, said first telephone including dialing means, said device comprising:

first memory means for storing a first coded signal corresponding to said first telephone number;

rate memory means for storing coded data corresponding to said initial and incremental values, and said initial and incremental time periods, for telephone calls from anywhere within the same area code as that of said first telephone to a multiplicity of other telephones including said second telephone;

transducer means responsive to said dialing means for generating a second coded signal corresponding to said second telephone number;

control means responsive to said first and second coded signals for generating a rate memory means address signal;

memory address means responsive to said address signal for addressing said rate memory means to generate coded signals corresponding to said initial and incremental values;

timing means for measuring the duration of said telephone call between said first and second telephones, and for providing timing signals at the expiration of said initial period and of each incremental period thereafter;

cost determining means responsive to said timing signals and to said coded signals corresponding to said initial and incremental values, for generating a total cost signal corresponding to the total current cost of said telephone call; and means for indicating the value of said total current cost signal to the calling party while the corresponding call is in progress.

42. The device according to claim 41, wherein said indicating means indicates the value of said total cost signal while said telephone call between said first and second telephones is in progress.

43. The device according to claim 41, wherein said address signal comprises information corresponding to the distance between points related to the geographic locations of said first and second telephones.

44. The device according to claim 41, further comprising signal retention means for causing said indicating means to indicate the total cost of said call, for a predetermined time period after termination of the call.

45. The device according to claim 41, wherein coded signals corresponding to the values of said initial and incremental time periods for each of said telephone calls from said first telephone to said multiplicity of other telephones, are stored in said rate memory means.

* * * * *